United States Patent
Burns et al.

(10) Patent No.: US 12,258,765 B2
(45) Date of Patent: Mar. 25, 2025

(54) NONWOVEN SURFACE COVERING ELEMENTS HAVING TONGUE AND GROOVE

(71) Applicant: SHAW INDUSTRIES GROUP, INC., Dalton, GA (US)

(72) Inventors: James Burns, Cartersville, GA (US); Derek Bass, Cartersville, GA (US); Thomas Odum, Tunnel Hill, GA (US)

(73) Assignee: Shaw Industries Group, Inc., Dalton, GA (US)

( * ) Notice: Subject to any disclaimer, the term of this patent is extended or adjusted under 35 U.S.C. 154(b) by 0 days.

(21) Appl. No.: 18/689,689

(22) PCT Filed: Oct. 25, 2023

(86) PCT No.: PCT/US2023/077753
§ 371 (c)(1),
(2) Date: Mar. 6, 2024

(87) PCT Pub. No.: WO2024/092019
PCT Pub. Date: May 2, 2024

(65) Prior Publication Data
US 2024/0271428 A1 Aug. 15, 2024

Related U.S. Application Data

(60) Provisional application No. 63/419,166, filed on Oct. 25, 2022.

(51) Int. Cl.
*E04F 13/00* (2006.01)
*B32B 3/06* (2006.01)
(Continued)

(52) U.S. Cl.
CPC ............ *E04F 13/0894* (2013.01); *B32B 3/06* (2013.01); *B32B 5/022* (2013.01); *B32B 5/06* (2013.01);
(Continued)

(58) Field of Classification Search
CPC ..... B32B 19/04; B32B 19/045; B32B 19/048; B32B 19/06; B32B 21/00; B32B 21/06;
(Continued)

(56) References Cited

U.S. PATENT DOCUMENTS 2,981,382 A 4/1961 Keller
5,983,586 A 11/1999 Berdan et al.
(Continued)

FOREIGN PATENT DOCUMENTS

JP  4319169  11/1992

OTHER PUBLICATIONS

International Search Report and Written Opinion were mailed on Feb. 9, 2024 by the International Searching Authority for International Application No. PCT/US2023/077753 filed on Filed on Oct. 25, 2023.

*Primary Examiner* — Chi Q Nguyen
(74) *Attorney, Agent, or Firm* — Ballard Spahr LLP

(57) ABSTRACT

A surface covering element can have a rigid core. The rigid core can include at least one densified fiber batt. The rigid core can have a first surface and an opposed second surface that are spaced apart along a first axis. The rigid core can have a plurality of edges that define a periphery of the rigid core. The plurality of edges can include at least a first edge and an opposed second edge that are spaced along a second axis that is perpendicular to the first axis. The first edge can include a tongue, and the second edge can define a groove.

26 Claims, 10 Drawing Sheets

(51) Int. Cl.
- *B32B 5/02* (2006.01)
- *B32B 5/06* (2006.01)
- *B32B 5/26* (2006.01)
- *B32B 7/02* (2019.01)
- *D04H 1/4374* (2012.01)
- *D04H 1/4382* (2012.01)
- *D04H 1/498* (2012.01)
- *D04H 1/72* (2012.01)
- *D04H 1/74* (2006.01)
- *E04F 13/08* (2006.01)
- *E04F 13/16* (2006.01)
- *E04F 15/02* (2006.01)
- *E04F 15/10* (2006.01)

(52) U.S. Cl.
CPC .............. *B32B 5/266* (2021.05); *B32B 5/271* (2021.05); *B32B 7/02* (2013.01); *D04H 1/4374* (2013.01); *D04H 1/43828* (2020.05); *D04H 1/498* (2013.01); *D04H 1/72* (2013.01); *D04H 1/74* (2013.01); *E04F 13/16* (2013.01); *E04F 15/02038* (2013.01); *E04F 15/102* (2013.01); *B32B 2250/20* (2013.01); *B32B 2262/124* (2021.05); *B32B 2307/30* (2013.01); *B32B 2307/412* (2013.01); *B32B 2307/72* (2013.01); *B32B 2307/7375* (2023.05); *B32B 2471/00* (2013.01); *D10B 2401/20* (2013.01); *D10B 2503/04* (2013.01); *E04F 2201/0107* (2013.01); *E04F 2201/0146* (2013.01); *E04F 2201/023* (2013.01); *E04F 2201/043* (2013.01); *E04F 2201/0505* (2013.01); *E04F 2201/07* (2013.01)

(58) Field of Classification Search
CPC ......... B32B 21/08; B32B 21/10; B32B 21/12; B32B 21/13; B32B 21/14; B32B 23/044; B32B 23/10; B32B 23/12; B32B 27/08; B32B 27/12; B32B 27/14; B32B 27/285; B32B 27/304; B32B 27/32; B32B 27/325; B32B 27/34; B32B 27/36; B32B 27/365; B32B 27/40; B32B 29/02; B32B 29/04; B32B 3/06; B32B 3/26; B32B 3/30; B32B 37/0038; B32B 37/06; B32B 37/10; B32B 37/18; B32B 5/024; B32B 5/08; B32B 5/12; B32B 5/16; B32B 5/18; B32B 5/245; B32B 5/30; B32B 7/02; B32B 7/08; B32B 7/12; B32B 9/002; B32B 9/007; B32B 9/025; B32B 9/04; B32B 9/045; B32B 9/047; B32B 9/048; B32B 2038/008; B32B 2038/042; B32B 2255/02; B32B 2255/10; B32B 2255/12; B32B 2255/26; B32B 2255/28; B32B 2262/02; B32B 2262/0207; B32B 2262/023; B32B 2262/0253; B32B 2262/0261; B32B 2262/0276; B32B 2262/0284; B32B 2262/0292; B32B 2262/06; B32B 2262/062; B32B 2262/08; B32B 2262/10; B32B 2262/101; B32B 2262/12; B32B 2262/14; B32B 2264/0257; B32B 2264/0278; B32B 2264/101; B32B 2264/105; B32B 2264/108; B32B 2264/12; B32B 2266/025; B32B 2266/0278; B32B 2270/00; B32B 2272/00; B32B 2307/102; B32B 2307/41; B32B 2307/412; B32B 2307/51; B32B 2307/546; B32B 2307/558; B32B 2307/718; B32B 2307/72; B32B 2307/724; B32B 2307/7246; B32B 2307/732; B32B 2307/734; B32B 2309/02; B32B 2309/105; B32B 2309/12; B32B 2419/04; B32B 2451/00; B32B 2471/00; B32B 2607/00; B32B 37/12; B32B 37/182; B32B 38/06; B32B 38/145

See application file for complete search history.

(56) References Cited

U.S. PATENT DOCUMENTS

| | | | |
|---|---|---|---|
| 7,841,144 B2 | 11/2010 | Pervan | |
| 9,156,233 B2 | 10/2015 | Dossche et al. | |
| 11,203,876 B2 * | 12/2021 | Delaney | E04B 1/7629 |
| 12,000,146 B2 * | 6/2024 | Smith | E04B 2/92 |
| 2002/0046526 A1 | 4/2002 | Knauseder | |
| 2005/0271852 A1 | 12/2005 | Solomon et al. | |
| 2007/0039268 A1 * | 2/2007 | Ambrose, Jr. | E04F 15/18 52/403.1 |
| 2013/0067838 A1 * | 3/2013 | Black | E04B 1/80 52/794.1 |
| 2016/0069085 A1 | 3/2016 | Simon et al. | |
| 2017/0036424 A1 * | 2/2017 | Chan | B32B 21/042 |
| 2018/0134016 A1 | 5/2018 | Burns et al. | |
| 2018/0283014 A1 * | 10/2018 | Hodgkins | E04F 15/105 |
| 2020/0263438 A1 | 8/2020 | Clement | |
| 2021/0370654 A1 * | 12/2021 | Burns | B32B 27/285 |
| 2022/0098875 A1 | 3/2022 | Drevet | |
| 2023/0366212 A1 * | 11/2023 | Courey | B32B 27/20 |
| 2024/0157689 A1 * | 5/2024 | Burns | B32B 9/025 |

* cited by examiner

NONWOVEN SURFACE COVERING ELEMENTS HAVING TONGUE AND GROOVE

CROSS-REFERENCE TO RELATED APPLICATION

This is a U.S. National Phase Application of International Application No. PCT/US2023/077753, filed Oct. 25, 2024, which claims priority to and the benefit of the filing date of U.S. Provisional Patent Application No. 63/419,166, filed Oct. 25, 2022, each of which is incorporated herein by reference in its respective entirety.

FIELD

This application relates generally to surface coverings and, in particular, to surface covering elements comprising nonwoven materials, the surface covering elements having a tongue and a groove.

BACKGROUND

Fiberboards, particularly medium-density fiberboards and high-density fiberboards, and plastic materials (such as PVC resins or other solid thermoplastic or thermoset polymers) are commonly used as core backing materials for floor coverings, wall coverings, and ceiling panels. For example, some existing floor panels generally consist of a chipboard core (such as a medium density fiberboard (MDF) or a high density fiberboard (HDF) core), or a PVC core, which are covered (laminated) with a decor layer and a use surface or a finishing layer.

Laminated floors have also proven to be a visually appealing, economically priced, relatively light weight flooring material, which can also be installed by lay persons. Furthermore, they are correspondingly widely spread. However, these laminated floors typically have relatively high impact noise, low radiant panel ratings, and high environmental impact.

There is still a need to obtain surface covering elements that do not require a complex layer structure in order to achieve characteristics suitable for being used in heavy duty applications. Still further, there is a need to obtain surface covering elements having one or more of high impact strength, swell heat resistance, heat retardance, dimensional stability, acceptable radiant panel ratings, and improved acoustical properties (such as sound propagation) as compared to existing fiberboards or composite boards. Still further, there is a need for a system for coupling such surface covering elements together to form a surface covering.

SUMMARY

Described herein, in various aspects, is a surface covering element comprising a rigid core. The rigid core comprises at least one densified fiber batt. The rigid core has a first surface and an opposed second surface that are spaced apart along a first axis. The rigid core comprises a plurality of edges that define a periphery of the rigid core. The plurality of edges comprises at least a first edge and an opposed second edge that are spaced along a second axis that is perpendicular to the first axis. The first edge comprises a tongue, and the second edge can define a groove.

Also described herein is a surface covering that comprises a plurality of surface covering elements, comprising at least a first surface covering element and a second surface covering element. The tongue of the first surface covering element is received with the groove of the second surface covering element.

Also described herein is a method of assembling a surface covering that comprises the step of assembling a plurality of surface covering elements comprising at least a first surface covering element and a second surface covering element. The tongue of the first surface covering element is inserted into the groove of the second surface covering element.

Also described herein is a method of making a surface covering element that comprises the step of forming, along a first edge of a rigid core, a tongue. The rigid core comprises at least one densified fiber batt comprising a first surface and an opposed second surface that are spaced apart along a first axis. The rigid core comprises a plurality of edges that define a periphery of the rigid core, the plurality of edges comprising at least the first edge and an opposed second edge that are spaced along a second axis that is perpendicular to the first axis.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

These and other features of the preferred embodiments of the invention will become more apparent in the detailed description in which reference is made to the appended drawings wherein.

DETAILED DESCRIPTION

Figure 1:
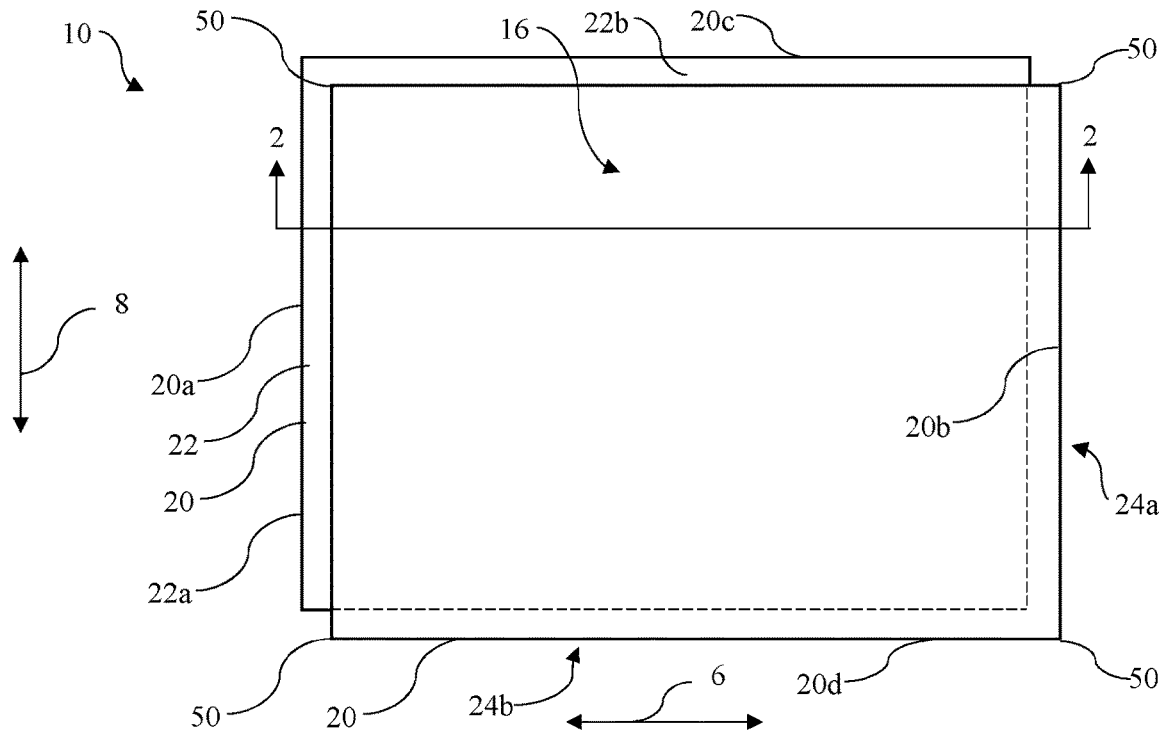
FIG. 1 is a top plan view of an exemplary surface covering element as disclosed herein.

The disclosed system and method may be understood more readily by reference to the following detailed description of particular embodiments and the examples included therein and to the Figures and their previous and following description.

Definitions

It is to be understood that the terminology used herein is for the purpose of describing particular embodiments only and is not intended to limit the scope of the present invention which will be limited only by the appended claims.

It must be noted that as used herein and in the appended claims, the singular forms "a," "an," and "the" can optionally include plural references unless the context clearly dictates otherwise. Thus, for example, unless the context dictates otherwise, reference to "a layer" represents disclosure of embodiments in which only a single layer is provided, as well as disclosure of embodiments in which a plurality of such layers are provided.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about." it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values are approximated by use of the antecedents "about." "substantially," or "generally." it is contemplated that values within up to 20%, up to 15%, up to 10%, up to 5%, or up to 1% (above or below) of the particularly stated value or characteristic can be included within the scope of those aspects. For example, the term "substantially" can in some aspects refer to at least 80%, at least 85%, at least 90%, at least 91%, at least 92%, at least 93%, at least 94%, at least 95%, at least 96%, at least 97%, at least 98%, at least 99%, or about 100% of the stated property, component, composition, or other condition for which substantially is used to characterize or otherwise quantify an amount.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

References in the specification and concluding claims to parts by weight of a particular element or component in a composition or article, denotes the weight relationship between the element or component and any other elements or components in the composition or article for which a part by weight is expressed. Thus, in a composition or a selected portion of a composition containing 2 parts by weight of component X and 5 parts by weight component Y, X and Y are present at a weight ratio of 2:5, and are present in such ratio regardless of whether additional components are contained in the composition.

A weight percent of a component, unless specifically stated to the contrary, is based on the total weight of the formulation or composition in which the component is included.

The term "fiber" as used herein includes fibers of extreme or indefinite length (i.e. filaments) and fibers of short length (i.e., staple fibers). It is further understood that the fiber described herein can be construed as it comprises materials of both virgin and recycled origin. In certain aspects of the surface covering elements disclosed herein, the fiber comprises recycled materials, wherein the recycled materials include, but are not limited to post-consumer or post-industrial materials, or a combination thereof. In yet other aspects, the fiber used in surface covering elements disclosed herein comprises virgin materials.

The term "oriented fiber" as used herein is directed to the fiber orientation in a fiber batt or a fiber matrix.

The term "rigid core" refers to any composite material comprising a rigid core and that is capable of withstanding heavy duty applications, such as for example, heavy foot traffic, without any significant deformation of the board. Still further, in aspects of the disclosure, a rigid surface covering element can be defined functionally in that it at least substantially prevents telegraphing of hard surface subfloor structure irregularities, such as ripples and waves, to the decorative layer portion when the surface covering element is abutting the subfloor structure in the selected orientation.

As used herein, the term "polyester" refers to a category of polymers that contain the ester functional group in their main chain. Polyesters disclosed herein include naturally occurring chemicals, such as in the cutin of plant cuticles, as well as synthetics produced through step-growth polymerization. An non-limiting example of polyesters includes any long-chain synthetic polymer composed of at least 85% by weight of an ester of a substituted aromatic dicarboxylic acid, including but not restricted to substituted terephthalic units, $p(-R-O-CO-C_6H_4-CO-O-)_x$ and parasubstituted hydroxy-benzoate units, $p(-R-O-CO-C_6H_4-O)_x$. In certain examples, the polyesters comprise polyethylene terephthalate (PET) homopolymer and copolymers, polypropylene terephthalate (PPT) homopolymer and copolymers and poly butylene terephthalate (PBT) homopolymer and copolymers, and the like, including those that contain comonomers such as cyclohexanedimethanol, cyclohexanedicarboxylic acid, isophthalic acid, and the like.

The term "polyamide," as utilized herein, is defined to be any long-chain polymer in which the linking functional groups are amide (—CO—NH—) linkages. The term polyamide is further defined to include copolymers, terpolymers and the like as well as homopolymers and also includes blends of two or more polyamides. In some aspects, the plurality of polyamide fibers comprise one or more of nylon 6, nylon 66, nylon 10, nylon 612, nylon 12, nylon 11, or any combination thereof. In other aspects, the plurality of polyamide fibers comprises nylon 6 or nylon 66. In yet other aspect, the plurality of polyamide fibers is nylon 6. In a yet further aspect, the plurality of polyamide fibers is nylon 66.

As defined herein, the term "polyolefin" refers to any class of polymers produced from a simple olefin (also called an alkene with the general formula $C_nH_{2n}$) as a monomer. In some aspects, the polyolefins include, but are not limited to, polyethylene, polypropylene, both homopolymer and copolymers, poly(1-butene), poly(3-methyl-1-butene), poly(4-methyl-1-pentene) and the like, as well as combinations or mixtures of two or more of the foregoing.

As defined herein, the term "polyurethane" refers to any class of polymers composed of a chain of organic units joined by carbamate (urethane, $R_1-O-CO-NR_2-R_3$, wherein $R_1$, $R_2$ and $R_3$ are the same or different) links.

As defined herein, the term "polystyrene" refers to any class of synthetic polymers produced from a simple styrene as a monomer. It is understood that the term "polystyrene" includes both atactic and syndiotactic polystyrenes. In some specific aspects, described are also co-polystyrenes including a high-impact polystyrenes (HIPS), acrylonitrile butadiene styrene (ABS) or copolymer of styrene with acrylonitrile (SAN), or copolymer of styrene with maleic acid (SMA).

As defined herein, the term "acetal" refers to a functional group with the following connectivity of $R_2C(OR')_2$, wherein both R groups can comprise hydrogen or organic fragments. The two R'O groups can be equivalent to each other (known as a symmetric acetal) or different (known as a mixed acetal).

In other aspects, as used herein, the term "substantially free," when used in the context of a composition or component of a composition that is substantially absent, is intended to refer to an amount that is less than about 1% by weight, e.g., less than about 0.5% by weight, less than about 0.1% by weight, less than about 0.05% by weight, or less than about 0.01% by weight of the stated material, based on the total weight of the composition.

As used herein, the term or phrase "effective," "effective amount," or "conditions effective to" refers to such amount or condition that is capable of performing the function or property for which an effective amount or condition is expressed. As will be pointed out below, the exact amount or particular condition required will vary from one aspect to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

As used herein, and unless the context clearly indicates otherwise, the term "carpet" is used to generically include broadloom carpet, carpet tiles, area rugs, and even artificial grass (or turf). To that end, the term "broadloom carpet" refers to a broadloom textile flooring product manufactured for and intended to be used in roll form. The term "carpet tile" refers to a modular floor covering, conventionally manufactured in 18"×18," 24"×24" or 36"×36" squares, but other sizes and shapes are also within the scope of the surface covering elements disclosed herein. Any of these exemplary carpets can be woven, non-woven, tufted, or needle-punched.

As used herein, the term "reclaimed fiber" includes a fiber reclaimed from a new product, post-industrial product, manufacturing remnants, quality control discarded or rejected material, or a post-consumer product. In some exemplary aspect, such products comprise carpets or carpet tiles.

As used herein, the term "post-consumer fiber" refers to a fiber that was a component part of a product previously in use by a consumer. The post-consumer fibers include fibers reclaimed from the products that have been used in residential, commercial, and industrial applications, and subsequently have been collected from the site of use or otherwise discarded.

As used herein, the term "post-industrial fiber" refers to a fiber reclaimed from a product that is a byproduct of the product manufacturing that has been diverted from the manufacturing waste stream.

As used herein, the term "acclimation period" refers to a period of time required for one or more components in the surface covering element to adjust or condition to equalize differing stresses that may be present in the various components. In some aspects, the lack of an "acclimation period" can refer to the lack of an acclimation period associated with assembly of the various component parts during manufacture of the surface covering element of the present disclosure. In other aspects, an acclimation period can refer to a period of time or lack thereof between product arrival at a site of installation and actual installation of the product.

Besides the locking means provided by the surface covering elements, the interlocking mechanism, as defined herein, can further include locking elements. In some examples, such locking elements can include strips with salient features that engage the locking element onto two adjacent articles. Such locking devices can be made of the same material as a surface covering element, aluminum, wood fiber, etc.

While aspects of the surface covering elements disclosed herein can be described and claimed in a particular statutory class, such as the system statutory class, this is for convenience only and one of ordinary skill in the art will understand that each aspect of the surface covering elements disclosed herein can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

The present invention may be understood more readily by reference to the following detailed description of various aspects of the invention and the examples included therein and to the Figures and their previous and following description.

Exemplary Surface Covering Elements

Figure 2:
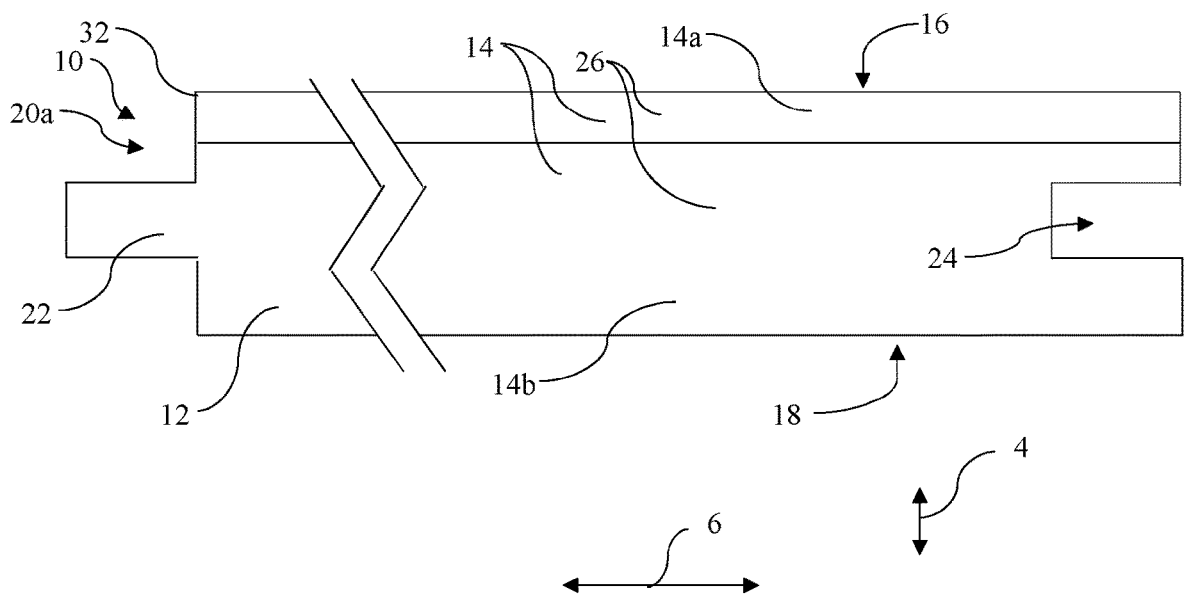
FIG. 2 is a cross sectional view of the surface covering element of FIG. 1 taken in the plane 2-2, and with a center portion removed to show end detail.
Figure 3:
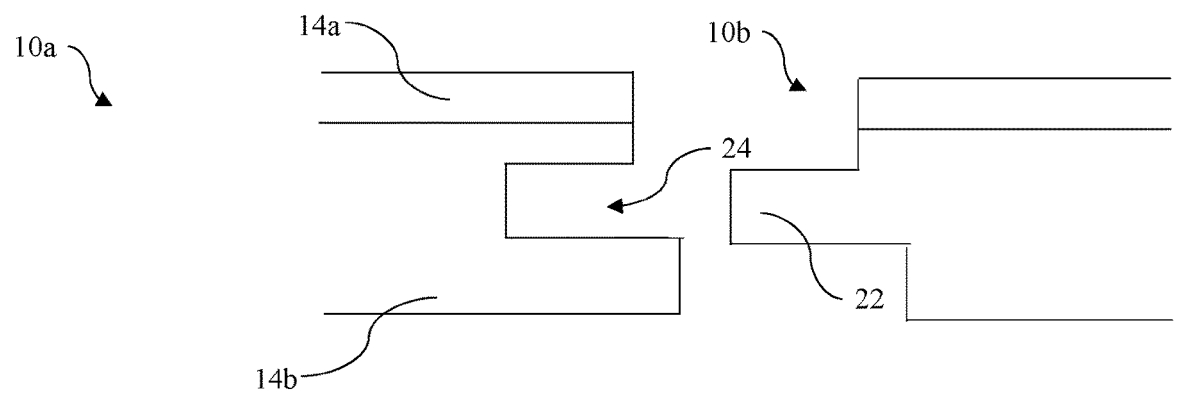
FIG. 3 is a schematic side view of a first surface covering element being assembled with a second surface covering element to form a surface covering.
Figure 4:
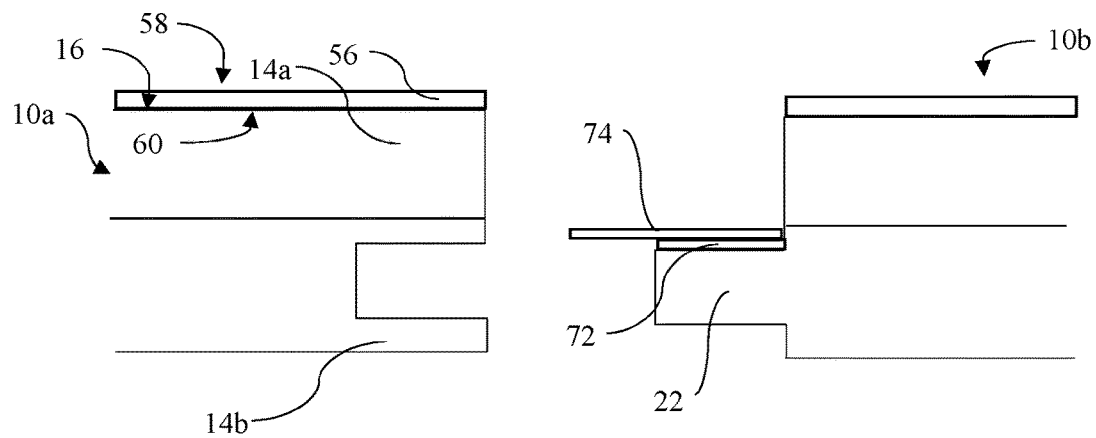
FIG. 4 is a schematic side view of a first surface covering element being assembled with a second surface covering element to form a surface covering.

Referring to FIGS. 1 and 2, a surface covering element 10 as disclosed herein can comprise a rigid core 12 comprising at least one densified fiber batt 14. The rigid core 12 can comprise a first surface 16 and an opposed second surface 18 that are spaced apart along a first axis 4. The rigid core 12 can comprise a plurality of edges 20 that define a periphery of the rigid core 12. The plurality of edges 20 can comprise at least a first edge 20a and an opposed second edge 20b that are spaced along a second axis 6 that is perpendicular to the first axis 4. The first edge 20a can comprise a tongue 22. The second edge 20b can define a groove 24.

In some aspects, the rigid core 12 can comprise a plurality of layers 26 of densified fiber batts 14. For example, in some aspects, the plurality of layers 26 of densified fiber batts 14 can comprise at least a first densified fiber batt 14a and a second densified fiber batt 14b. In some optional aspects, the first densified fiber batt 14a can have a first density, and the second densified fiber batt 14b can have a second density that is greater than the first density. It is contemplated that the greater second density of the second densified fiber batt 14b can provide rigidity to the rigid core. In this way, the densified fiber batt having the greater second density can, for example, span uneven floors and resist indentation. The densified fiber batt having the lower density of the first densified fiber batt 14a can provide mechanical absorption of the rigid core 12. In this way, the first densified fiber batt can reduce noise, both in the room in which the surface covering element is positioned and can reduce nose conduction through the surface (e.g., floor) and into an adjacent room.

In exemplary aspects, the second density can be from 40 lb/ft$^3$ to about 100 lb/ft$^3$. In exemplary aspects, the first density can be from 10 lb/ft$^3$ to 30 lb/ft$^3$. In further aspects, the first density can be from 5 lb/ft$^3$ to 100 lb/ft$^3$, or from 5 lb/ft$^3$ to 30 lb/ft$^3$. In other aspects, the second density can be from 5 lb/ft$^3$ to 100 lb/ft$^3$, or from 30 lb/ft$^3$ to 100 lb/ft$^3$, 75 lb/ft$^3$ to 120 lb/ft$^3$, or about 100 lb/ft$^3$.

In certain aspects, the first density can be from about 5 lb/ft$^3$ to about 100 lb/ft$^3$, including exemplary densities of 10, 15, 20, 25, 30, 35, 40, 45, 50, 55, 60, 65, 70, 75, 80, 85, 90, 95, 100, 105, 110, 115, or 120 lb/ft$^3$. In still further aspects, the first density can be a value within any range derived from the above values, including for example, a density of from about 15 to about 75 pounds per cubic foot. In still further aspects, the first density can be up to 100 lb/ft$^3$.

In certain aspects, the second density can be from about 5 lb/ft$^3$ to about 100 lb/ft$^3$, including exemplary densities of 10, 15, 20, 25, 30, 35, 40, 45, 50, 55, 60, 65, 70, 75, 80, 85, 90, 95, 100, 105, 110, 115, or 120 lb/ft$^3$. In still further aspects, the second density can be a value within any range derived from the above values, including for example, a density of from about 15 to about 75 pounds per cubic foot.

In certain aspects, the first density can be at least about 10 lb/ft$^3$, including exemplary values of at least about 15 lb/ft$^3$, about 20 lb/ft$^3$, about 25 lb/ft$^3$, about 30 lb/ft$^3$, about 35 lb/ft$^3$, about 40 lb/ft$^3$, about 45 lb/ft$^3$, or about 50 lb/ft$^3$. In certain aspects, the first density can be a range between any two foregoing values.

In certain aspects, the second density can be at least about 10 lb/ft$^3$, including exemplary values of at least about 15 lb/ft$^3$, about 20 lb/ft$^3$, about 25 lb/ft$^3$, about 30 lb/ft$^3$, about 35 lb/ft$^3$, about 40 lb/ft$^3$, about 45 lb/ft$^3$, or about 50 lb/ft$^3$. In certain aspects, the second density can be a range between any two foregoing values.

In yet other aspects, the first density can be no greater than about 50 lb/ft$^3$, about 45 lb/ft$^3$, about 40 lb/ft$^3$, about 35 lb/ft$^3$, about 30 lb/ft$^3$, 25 lb/ft$^3$, about 20 lb/ft$^3$, about 15 lb/ft$^3$, or about 10 lb/ft$^3$. In certain aspects, the first density can have a density in a range between any two foregoing values. It is understood the first density can be as low as a density of a fiber batt comprising a substantially identical first plurality of fibers and a substantially identical a second plurality of fibers that has not undergone any densification processes, for example heating or pressurizing.

In yet other aspects, the second density can be no greater than about 50 lb/ft$^3$, about 45 lb/ft$^3$, about 40 lb/ft$^3$, about 35 lb/ft$^3$, about 30 lb/ft$^3$, 25 lb/ft$^3$, about 20 lb/ft$^3$, about 15 lb/ft$^3$, or about 10 lb/ft$^3$. In certain aspects, the second density can have a density in a range between any two foregoing values. It is understood the second density can be as low as a density of a fiber batt comprising a substantially identical first plurality of fibers and a substantially identical a second plurality of fibers that has not undergone any densification processes, for example heating or pressurizing.

In exemplary aspects, the first density can be from 10 lb/ft$^3$ to 30 lb/ft$^3$ and the second density can be from 40 lb/ft$^3$ to about 100 lb/ft$^3$. In exemplary aspects, the first density can be from 10 lb/ft$^3$ to 100 lb/ft$^3$, and the second density can be from 5 lb/ft$^3$ to 100 lb/ft$^3$, or from 30 lb/ft$^3$ to 100 lb/ft$^3$, 75 lb/ft$^3$ to 120 lb/ft$^3$, or about 100 lb/ft$^3$. In further aspects, the first density can be from 5 lb/ft$^3$ to 100 lb/ft$^3$, or from 5 lb/ft$^3$ to 30 lb/ft$^3$, and the second density can be from 40 lb/ft$^3$ to about 100 lb/ft$^3$. In other aspects, the first density can be from 5 lb/ft$^3$ to 100 lb/ft$^3$, or from 5 lb/ft$^3$ to 30 lb/ft$^3$, and the second density can be from 5 lb/ft$^3$ to 100 lb/ft$^3$, or from 30 lb/ft$^3$ to 100 lb/ft$^3$, 75 lb/ft$^3$ to 120 lb/ft$^3$, or about 100 lb/ft$^3$. In some optional aspects, it is contemplated that at least one of the first density or the second density can range from 35 lb/ft$^3$ to 60 lb/ft$^3$. In other optional aspects, it is contemplated that both the first density and the second density can range from 35 lb/ft$^3$ to 60 lb/ft$^3$.

In some optional aspects, the first and second densified fiber batts 14a and 14b can be needle punched together. For example, prior to densification, one or more needles can be plunged through the first and second fiber batts to entangle fibers of the respective fiber batts.

In some optional aspects, the first densified fiber batt 14a can define the first surface 16 of the rigid core 12.

In exemplary aspects and as illustrated in FIG. 2, the second densified fiber batt 14b can define the tongue 22, and portions of the second densified fiber batt 14b can define the groove 24. Accordingly, the in aspects in which the second densified fiber batt 14b has a greater density than that of the first fiber batt 14a, the tongue and groove can be formed in the denser, sturdier fiber batt of the second densified fiber batt.

In further aspects, the tongue 22 and groove 24 can span across the first densified fiber batt 14a and the second densified fiber batt 14b.

In yet further aspects, when the surface covering element 10 further comprises an additional backing material (e.g., a bottom cushion layer) as further disclosed herein, it is contemplated that the tongue 22 and groove 24 can span across the first densified fiber batt 14a, the second densified fiber batt 14b, and one or more of the additional backing material(s). Alternatively, the tongue 22 and groove 24 can span across one or more densified fiber batts and not extend within the additional backing material layer(s).

In exemplary aspects, the least one densified fiber batt 14 can comprise a first densified fiber batt 14a having a density from 40 lb/ft³ to about 100 lb/ft³.

The tongue 22 can have a thickness along the first axis 4. In some aspects, the thickness of the tongue can be less than 2 mm. In further aspects, the tongue 22 can have a thickness from about 3 mm to about 0.5 mm, or from about 2 mm to about 1 mm. In still further aspects, the rigid core 12 can have a thickness defined by a spacing between the first surface 16 and the second surface 18 along the first axis 4, and the tongue 22 can have a thickness along the first axis from about 10 to about 50% of the thickness of the rigid core. Accordingly, thicker rigid cores 12 can accommodate thicker tongues and corresponding grooves. However, it is contemplated that embodiments disclosed herein can accommodate relatively thin tongues, as compared to other surface covering materials, as the fiber batt(s) 14 that form the tongue and groove (e.g., the second fiber batt 14b) have sufficient durability and toughness.

In some aspects, the first surface 16 of the rigid core 12 can meet the first edge 20a at a first boundary 32 of the rigid core 12. The tongue 22 can extend from the first boundary 32 of the rigid core 12 by a protrusion distance along the second axis 6. In some aspects, the protrusion distance can be at least 2 mm, or at least 5 mm, or from about 2 mm to about 15 mm. In various aspects, the protrusion length can be from about ¼ of the thickness of the rigid core 12 to about 5 times the thickness of the rigid core. As can be understood, the durability and toughness of the embodiments disclosed herein can tongues with relatively long protrusion distances, as compared to other surface covering materials. In some aspects and as further described herein, the tongue 22 can have a sufficient protrusion distance.

It is contemplated that the fibrous nature of the rigid core 12 can provide a surface profile that has strong frictional engagement with adjacent rigid cores. That is, fiber-to-fiber contact between rigid cores can provide strong frictional engagement. Accordingly, the fibrous nature of the rigid core can promote the interlocking fit of the tongue and groove connection to inhibit relative movement of coupled rigid cores.

Figure 5:
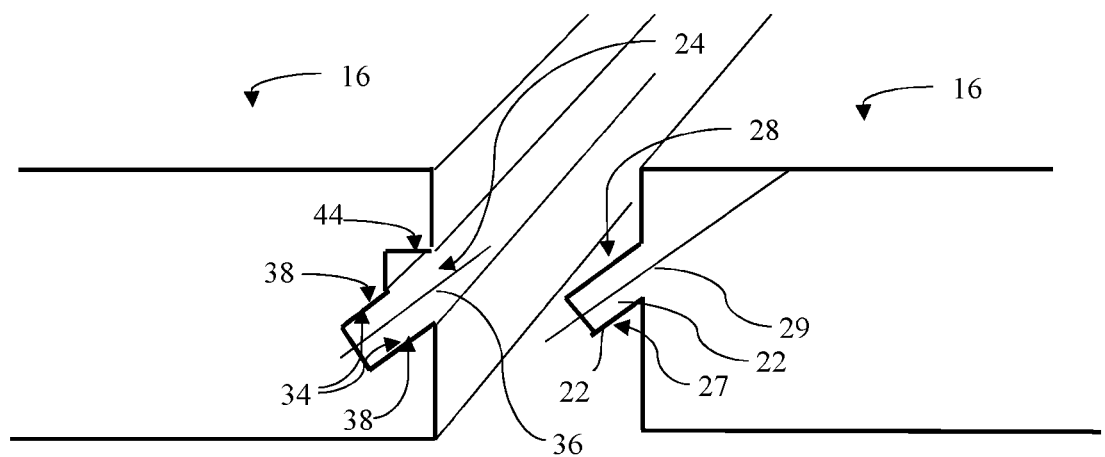
FIG. 5 is a schematic side view of a first surface covering element being assembled with a second surface covering element, wherein the first and second surface covering elements have tongues and grooves as disclosed herein.
Figure 6:
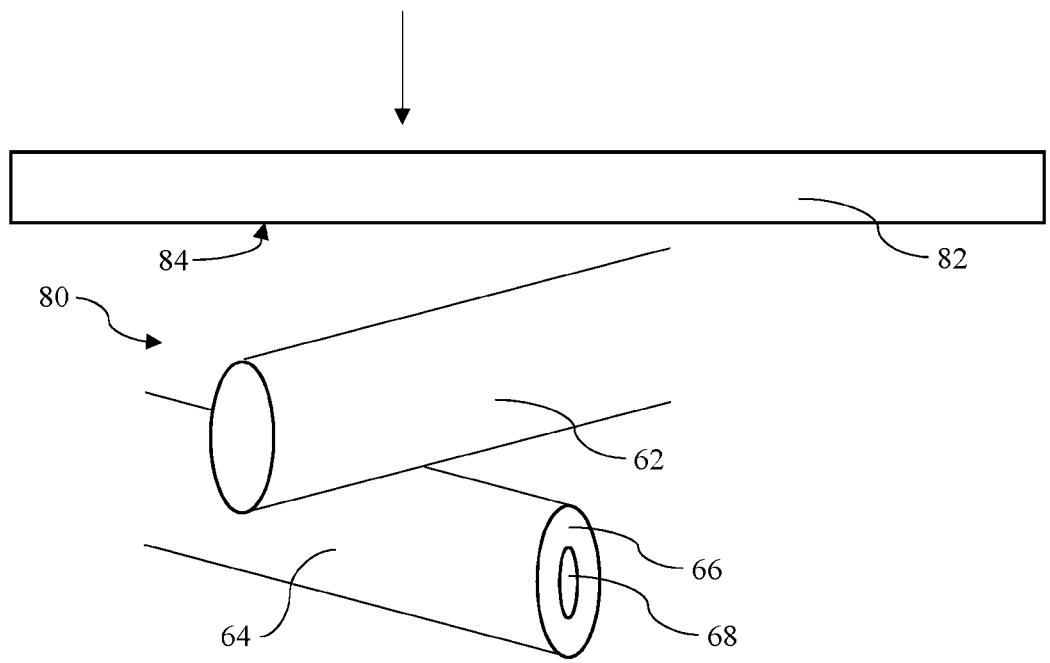
FIG. 6 is a schematic view of first and second pluralities of a fiber batt being formed into a densified fiber batt.

Referring to FIG. 5, in some aspects, the tongue 22 can protrude at an angle relative to the first surface 16. For example, the tongue 22 can have opposed first and second surfaces 27, 28 that are spaced along the first axis 4. A reference plane 29 can bisect the opposed first and second surfaces 27, 28 of the tongue. That is, the reference plane can be equidistant from the opposed first and second surfaces 27, 28. The reference plane 29 can form an oblique angle with the first surface 16 of the rigid core 12. The oblique angle can be, for example, from 5 degrees to 45 degrees.

In further aspects, the tongue can extend generally parallel to the first and second surfaces 16, 18. That is, the reference plane 29 can be parallel to the rigid core 12.

To accommodate the angled tongue, the groove 24 can likewise be angled. For example, the groove 24 can be defined between opposed inner surfaces 34. The opposed inner surfaces 34 can comprise first opposed portions 38. A second reference plane 36 can bisect the first opposed portions 34. The second plane 36 can form an oblique angle (e.g., the same oblique angle as the tongue) with the first surface 16 of the rigid core 12.

Optionally, at least one inner surface of the opposed inner surfaces 34 that define the groove 24 can comprise a second portion 44 that is parallel to the first surface of the rigid core. In this way, the groove 24 can accommodate both an angled tongue and a non-angled tongue.

Figure 13:
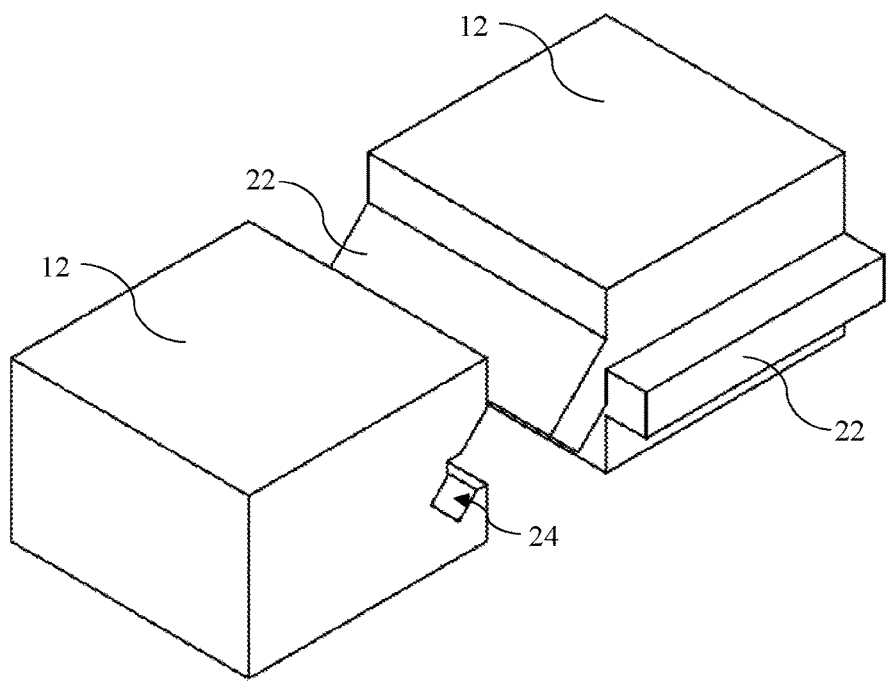
FIG. 13 is a perspective view of exemplary segments of adjacent rigid cores in accordance with embodiments disclosed herein.
Figure 14:
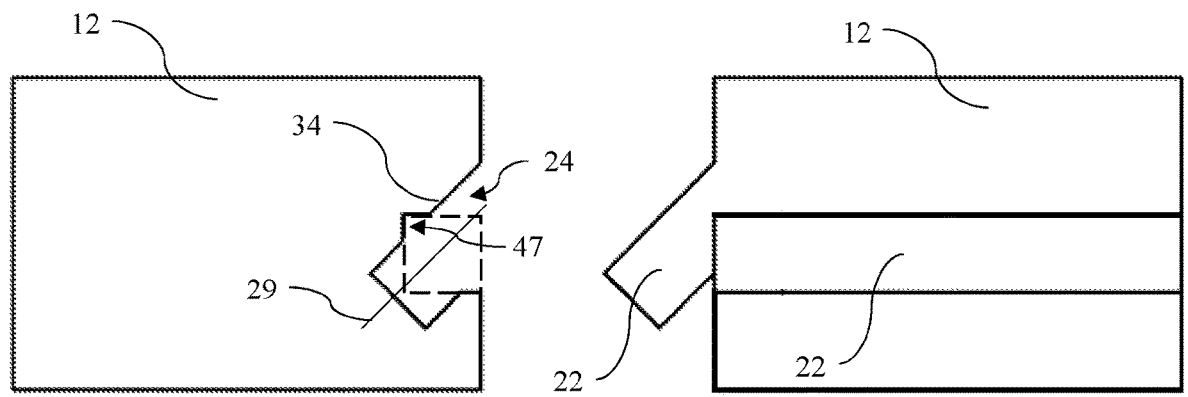
FIG. 14 is a cross sectional profile of the segments of FIG. 13.

Referring also to FIGS. 13 and 14, the groove 24 can have the profile of an overlapping horizontal tongue (that is, a tongue that is parallel to the first surface 16 of the rigid core 12) and an angled tongue (that is, a tongue that is not parallel to the first surface). In this way, the groove 34 can be configured to receive a rectangular tongue (shown in broken lines) or an angled tongue. In this way, the groove can receive either type of tongue. The inner surfaces 34 of the groove 24 can have a generally parallel portions that are parallel to the reference plane 29, and a notch 47 can be formed into one of the inner surfaces to receive a portion of a horizontal tongue.

In some aspects, the rigid core 12 can have a combination of angled tongues and horizontal tongues. For example, the first and second sides 20a,b can have angled tongues and the third and fourth sides 20c,d can have horizontal tongues. It is contemplated that the groove 22 can be configured to receive both tongue profiles in order to permit coupling of the rigid cores in different rotational orientations (about the first axis 4).

Figure 15:
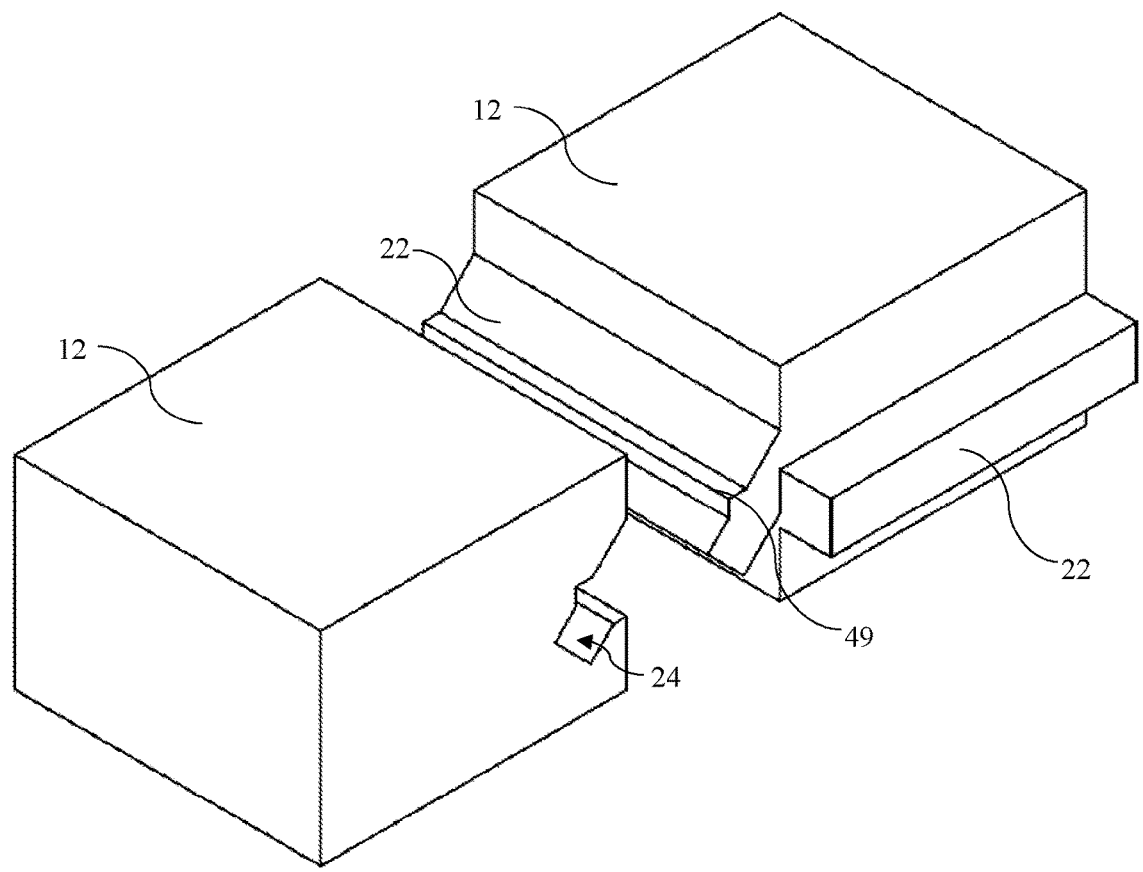
FIG. 15 is a perspective view of exemplary segments of adjacent rigid cores in accordance with embodiments disclosed herein.
Figure 16:
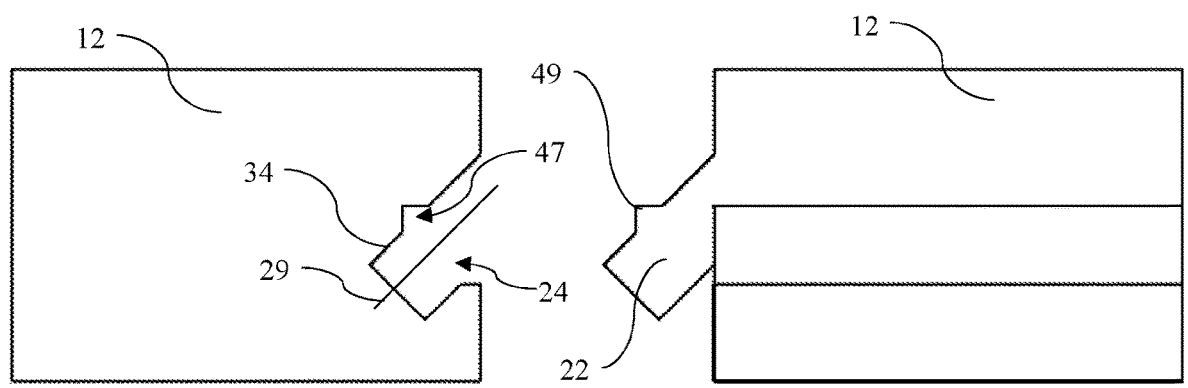
FIG. 16 is a cross sectional profile of the segments of FIG. 15.

Referring also to FIGS. 15 and 16, it is contemplated that the angled tongue can define a corresponding jutting profile 49 that is receivable into the groove 47. In this way, the tongue and groove can have an interlocking profile. It is further contemplated that the groove 24 can flex to permit receipt of the jutting profile 49.

Figure 10:
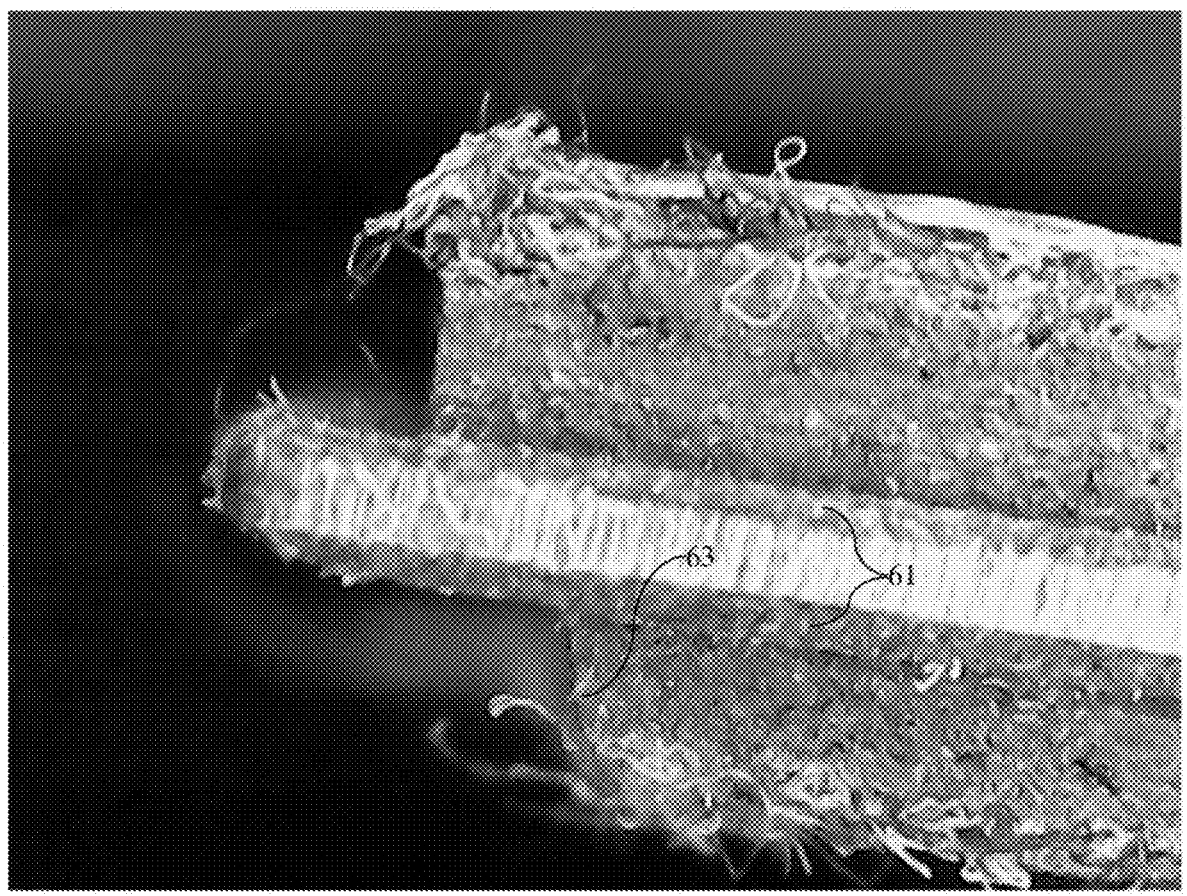
FIG. 10 is a close up image of a second corner of an exemplary surface covering element as disclosed herein.
Figure 11:
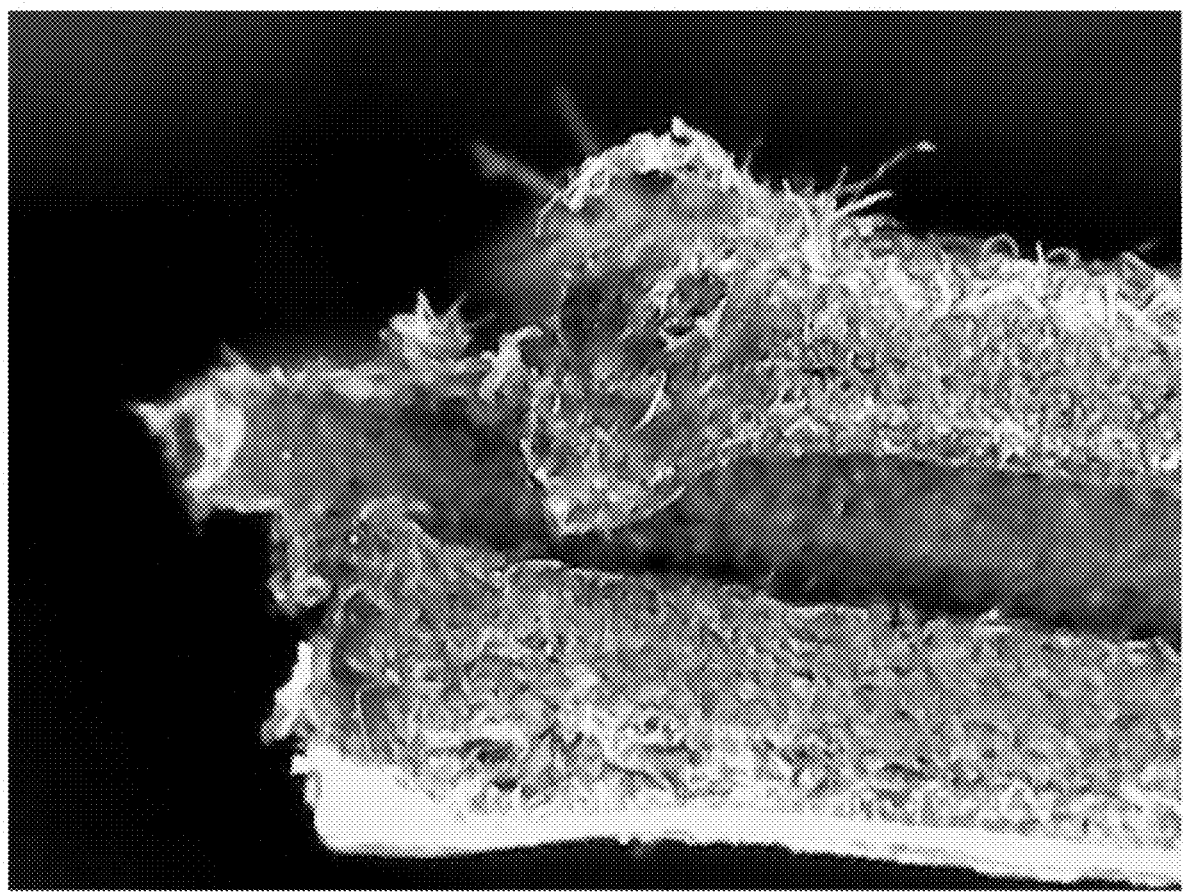
FIG. 11 is a close up image of a third corner of an exemplary surface covering element as disclosed herein.
Figure 12:
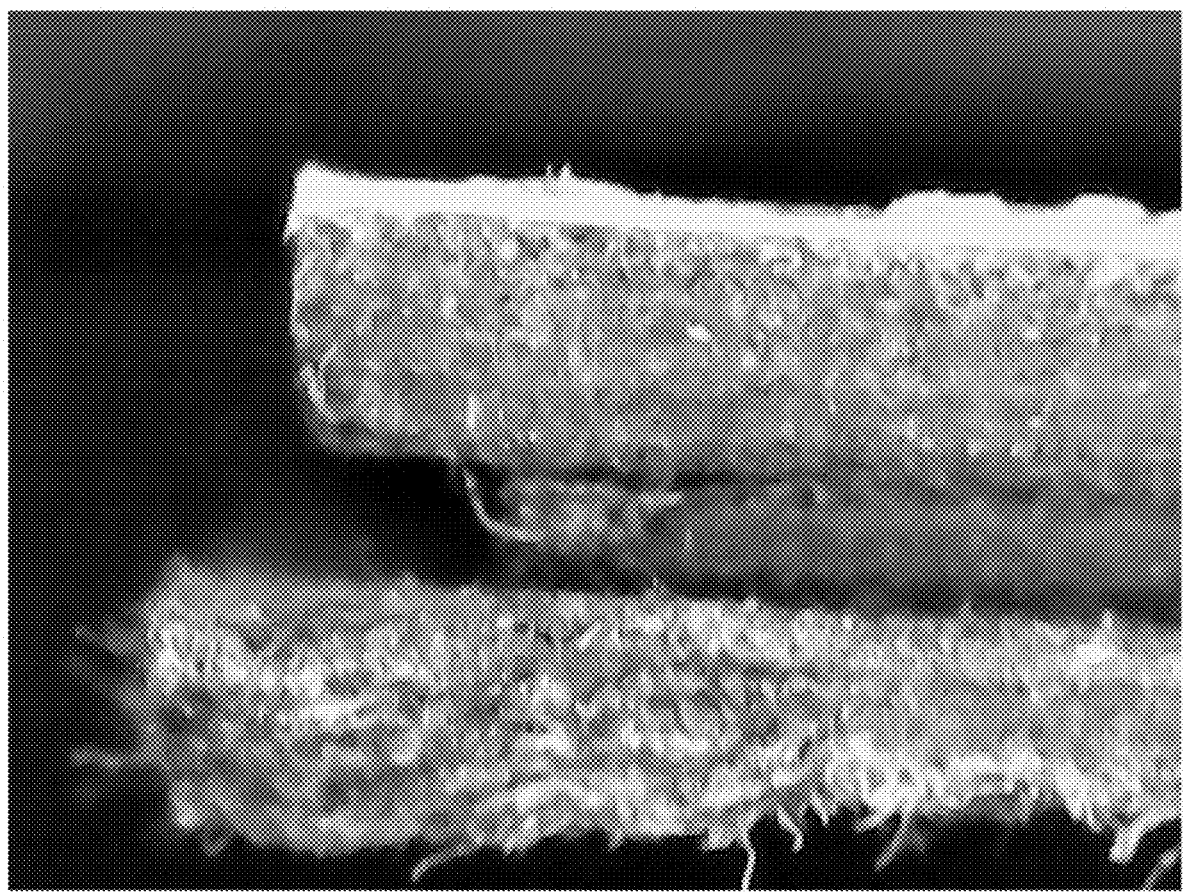
FIG. 12 is a close up image of a fourth corner of an exemplary surface covering element as disclosed herein.

Although the tongues and grooves are shown as having generally rectangular, blunt ends, it is contemplated that, in further aspects, the tongue and/or the groove of the rigid core can have rounded or tapered ends. For example, referring to FIG. 10, the tongue 22 can have chamfered edges.

In some aspects, the tongue 22 and the groove 24 can be formed by machining. In doing so, the machining can impart a surface profile that improves frictional engagement between the tongue and groove of adjoining surface covering elements.

In some aspects, and with reference to FIG. 1, the first and second edges 20a,b can comprise opposed ends 50. The plurality of edges further comprise opposed third and fourth edges 20c,d that extend between respective opposed ends 50 of the first and second edges 20a,b. The tongue 22 can be a first tongue 22a, and the groove 24 can be a first groove 24a. The third edge 20c can define a second tongue 22b, and the fourth edge can define a second groove 24b.

Optionally, the first and second edges can extend perpendicularly to, or generally perpendicularly to, the third and fourth edges. In further aspects, the first and second edges can meet the third and fourth edges at oblique angles.

The first edge 20a can have a length along a third axis 8 that is perpendicular to each of the first and second axes 4,6. In some aspects, the tongue 22 can have a length that is equal to, or substantially equal to, the length of the first edge 20a. In further aspects, the tongue can have a length that is less than the length of the first edge.

Figure 7:
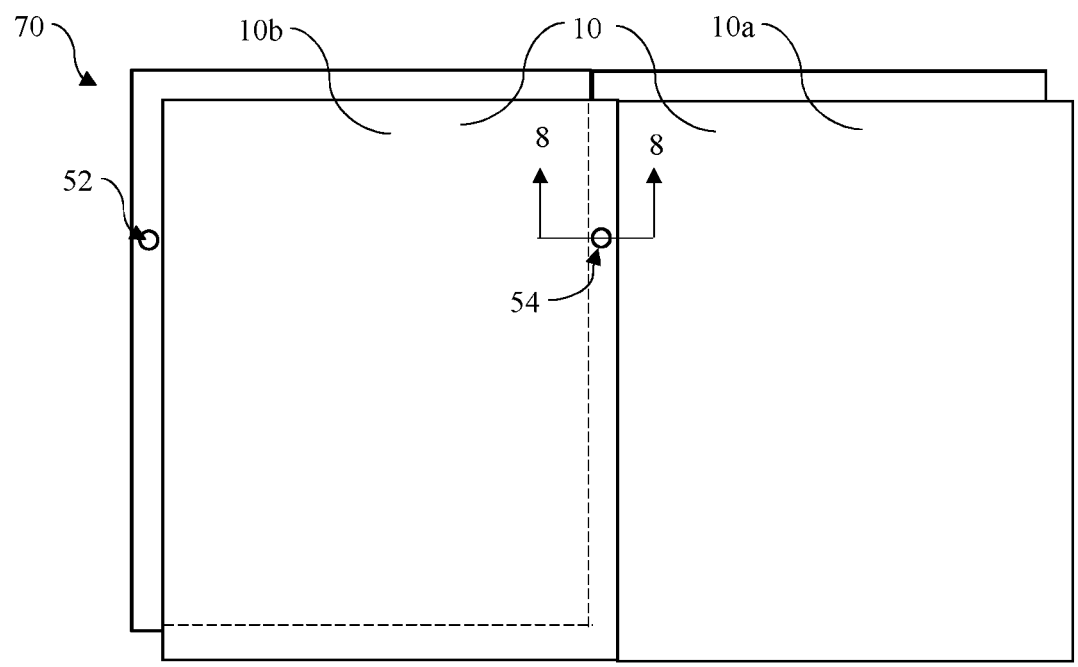
FIG. 7 is a schematic top plan view of a surface covering comprising surface covering elements disclosed herein.
Figure 8:
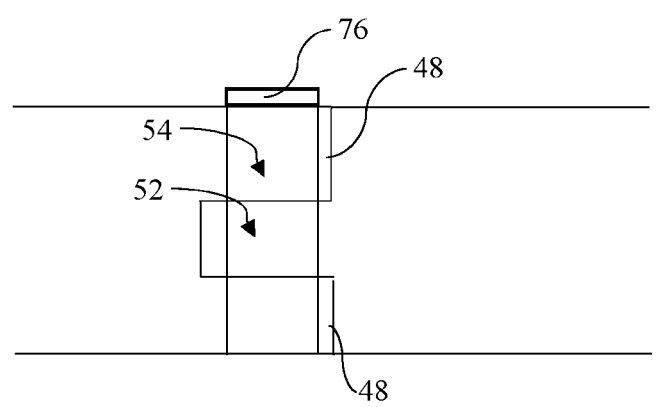
FIG. 8 is a schematic cross sectional view of the surface covering of FIG. 7.
Figure 9:
FIG. 9 is a close up image of a first corner of an exemplary surface covering element as disclosed herein.

Referring to FIGS. 7-8, the groove 24 can be defined by opposed legs 48. In some aspects, the rigid core 12 can define at least one through opening 52 that extends through the tongue along the first axis and at least one through opening 54 that extends through the legs 48 that define the groove 24 from the first surface 16 to the second surface 18 of the rigid core 12. In this way, adjacent surface covering elements can be arranged so that their respective openings 52, 54 align, and fasteners can be inserted therethrough to secure their position with respect to each other. In this way, alignment between surface covering elements can be achieved. For example, in some aspects, the surface covering elements 10 can be arranged in a particular pattern (e.g., a herringbone pattern), and the openings 52, 54 can assist in alignment for the particular pattern.

Optionally, the surface covering element 10 can comprise a decorative portion 56 having a first surface 58 and an opposed second surface 60, and the second surface 60 of the decorative portion 56 can be affixed to the first surface 16 of the rigid core 12.

In some aspects, one or more (optionally, all) of the densified fiber batts 14 can comprise randomly oriented fibers. In further aspects, one or more (optionally, all) of the densified fiber batts 14 can comprise substantially uniformly oriented fibers.

In some aspects, one or more (optionally, all) of the densified fiber batts 14 can comprise a first plurality of fibers 62 and a second plurality of fibers 64. The first plurality of fibers can have a first melting point. At least a portion of the second plurality of fibers can have a second melting point that is lower than the first melting point. In this way, when the first and second plurality of fibers are heated to a temperature above the second melting point but less than the first melting point, the second plurality of fibers can bind to the first plurality of fibers. Thus, in some aspects, it is contemplated that the first plurality of fibers 62 (e.g., mono fibers) do not melt while the sheath of the second plurality of fibers 64 melt. As used herein, the melting point can refer to a temperature at which a material softens enough to bind with itself and/or other fibers. Thus, the melting point can be a softening point.

In some aspects, an entirety of the second plurality of fibers can have the second melting point.

In further aspects, only a portion of the second plurality of fibers has the second melting point. For example, in some aspects, the second plurality of fibers 64 can comprise a multi-component fiber. In exemplary aspects, the multi-component fiber can only an outer portion 66 of the of the second plurality of fibers 64 has the second point, and an inner portion 68 of the second plurality of fibers can have a higher melting point than the second melting point. In these aspects, the second plurality of fibers 64 can comprises a sheath and a core provided as a sheath core configuration.

In still further aspects, it is contemplated that the first plurality of fibers can have a first melting point: a first portion (e.g., a sheath) of the second plurality of fibers can have a second melting point, and second portion of the second plurality of fibers (e.g., a core) can have a third melting point. In some aspects, the first and second plurality of fibers can be heated to a temperature above the first and second melting points and below the third melting point. In this way, the first plurality of fibers and first portion of the second plurality of fibers can soften and bind together, while the second portion of the second plurality of fibers does not melt. Optionally, in these aspects, the second and third melting points can be the same. For example, the first plurality of fibers and the first portion of the second plurality of fibers can optionally comprise the same material. Thus, it is contemplated that the first plurality of fibers and the sheaths of the second plurality of fibers can both melt.

The surface covering element can be configured for various surfaces. For example, in some aspects, the surface covering element can be a flooring element. In further aspects, the surface covering element can be a wall covering element. In still further aspects, the surface covering element can be an erosion control mat.

Optionally, the rigid core can comprise light transmitting fibers.

The surface covering elements 10 can be configured to couple to each other to form a surface covering 70. For example, in some aspects, the surface covering elements 10 can comprise an adhesive 72 on the tongue 22. Optionally, the adhesive can be a compression-activated adhesive. For example, the adhesive can comprise adhesive elements (e.g., nanospheres) that, when crushed, activate the adhesive. In these aspects, surface covering elements can be assembled with interlocking respective tongue and groove, and the assembly can be tapped with a hammer along the interlocking tongue and groove to activate the adhesive. In further aspects, the adhesive can be an ultraviolet (UV)-activated adhesive. In these aspects, the rigid core 12 of a coupled surface covering element 10 can comprise light-transmitting fibers to permit activation of the UV-activated adhesive. In some aspects, a release liner 74 can cover the adhesive 72.

An exemplary surface covering 70 can comprise a plurality of surface covering elements 10 comprising a first surface covering element 10a and a second surface covering element 10b. The tongue 22 of the first surface covering 10a element can be received within the groove 24 of the second surface covering element. In some aspects, the adhesive 72 can couple the tongue 22 of the first surface covering element 10a to the groove 24 of the second surface covering element 10b.

In some aspects, the first surface covering element 10a can comprise at least one through opening 52 that extends through the tongue of the first surface covering element, and the second surface covering element 10b can comprise at least one through opening 54 that extends through the legs that define the groove. A fastener 76 can extend through each aligned through opening 52, 54 of the first and second surface covering elements. The fastener can be a staple, nail, screw, tack, soil anchor, soil spike, soil screw, or any other suitable fastener.

Methods of Assembly of Surface Covering Elements

The tongue 22 of the first surface covering element 10a can be inserted into the groove 24 of the second surface covering element 10b. In some optional aspects, the tongue of the first surface covering element can be adhered to the groove of the second surface covering element. For example, in aspects comprising adhesive 72 that is ultraviolet-activated, the ultraviolet-activated adhesive can be activated with ultraviolet radiation.

Methods of Making of Surface Covering Elements

The tongue 22 can be formed along the first edge 20a of the rigid core 12. The groove 24 can be formed along the second edge 20b of the rigid core 12. In exemplary aspects, one or both of the tongue and groove can be formed by machining. For example, groove can be machined by a CNC machine. In further aspects, the groove can be machined by a double ended tenoner.

In some aspects, the tongue and groove can be formed without releasing and resetting the rigid core 12. In these aspects, the rigid core can be secured to a machining device (e.g., a CNC machine), and the rigid core can be released from the machining device only after the tongue and the groove have been machined. In embodiments comprising first and second tongues 22a,b and first and second grooves

24a,b, each of the tongues and grooves can be formed around the perimeter of the rigid core 12 without releasing the rigid core from the machining device. Thus, the rigid core 12 does not need to be re-oriented relative to the machining device when forming each edge 20.

In some aspects, the rigid core 12 can be formed in a mold. In some optional aspects, each densified fiber batt 14 can be formed in a respective mold. In other aspects, a plurality of densified fiber batts (e.g., first and second densified fiber batts 14a,b) can be formed in the same mold.

A fiber batt 80 can be heated at a first temperature for a first period of time. The heated fiber batt can be subjected to pressure with a surface 84 of a press 82. The surface 84 of the press 82 can have a surface temperature that is less than the first temperature. Subjecting the heated fiber batt to the surface of the press can form the densified fiber batt 14.

In some aspects, the fiber batt 80 can comprise a first plurality of fibers 62 having a first melting point and a second plurality of fibers 64. At least a portion of the second plurality of fibers 64 can have a second melting point that is lower than the first melting point. The first temperature at which the fiber batt 80 can be greater than the second melting point and lower than the first melting point. For example, in some aspects, such as, for example, those in which the first plurality of fibers comprise PET, the first temperature can be about 400° F. This temperature can be below the melting point of PET but above the second melting point of the second plurality of fibers (or a portion thereof).

In further aspects, only a portion of the second plurality of fibers has the second melting point. For example, in some aspects, the second plurality of fibers 64 can comprise a multi-component fiber. In exemplary aspects, only an outer portion 66 of the of the second plurality of fibers 64 has the second point, and an inner portion 68 of the second plurality of fibers can have a higher melting point than the second melting point. In these aspects, the second plurality of fibers can comprises a sheath and a core provided as a sheath core configuration.

In some aspects, the rigid core 12 can be formed from a plurality of densities fiber batts 14 including at least a first densified fiber batt 14a and a second densified fiber batt 14b. The plurality of densified fiber batts 14 can be needle punched to entangle the first densified fiber batt and the second densified fiber batt.

In some aspects, the first densified fiber batt 14a has a first density, and the second densified fiber batt has a second density that is greater than the first density. In some optional aspects, the first densified fiber batt 14a can define the first surface 16 of the rigid core 12.

In some optional aspects, prior to being densified, the first and second fiber batts can be needlepunched to entangle fibers of the first fiber batt with the second fiber batt. For example, one or more needles can be plunged through the first fiber batt and into the second fiber batt to entangle fibers of the respective densified fiber batts. In this way, once densified, the first and second densified fiber batts 14a,b can be remain entangled.

In still further aspects, the densified fiber batt 14 can further comprise a third plurality of fibers comprising a natural fiber having a decomposition temperature.

In still further aspects, described herein is a method of making a surface covering element comprising: forming a rigid core comprising at least one densified fiber batt and wherein the at least one densified fiber batt is comprises a first plurality of fibers comprising and a second plurality of fibers.

In some aspects, the natural fiber can have a decomposition temperature and the first plurality of fibers, or a portion thereof (e.g., sheath core fiber, as further disclosed herein) can having a melting point lower than the decomposition temperature of the first plurality of fibers.

In some aspects, the at least one densified fiber bat can be formed by: a) overlaying the first plurality of fibers and the second plurality of fibers to form a fibrous matrix: b) needle punching the fibrous matrix to form a fiber batt; and c) heat and pressure treating the fiber batt under conditions effective to form the at least one densified fiber batt.

In some other aspects, a third plurality of fibers can be present. In these aspects, the at least one densified fiber bat can be formed by: a) overlaying the first plurality of fibers, the second plurality of fibers and the third plurality of fibers to form a fibrous matrix: b) needle punching the fibrous matrix to form a fiber batt; and c) heat and pressure treating the fiber batt under conditions effective to form the densified fiber batt.

It is further understood that the first, second, and third plurality of fibers can comprise any foregoing fibers.

It is further understood that any method known in the art that provides entanglement of the fibers can be utilized. In some aspects, the step of needle punching is optional. In yet other aspects, the step of needle punching can be replaced by a step of hydro entanglement, pneumatic entanglement, or any other method capable of holding fibers together.

In certain aspects, the methods described herein provide a densified fiber batt(s) (e.g., the first fiber batt 14a or the second densified fiber batt 14b) having a respective density of from about 5 lb/ft$^3$ to about 100 lb/ft$^3$, including exemplary densities of 10, 15, 20, 25, 30, 35, 40, 45, 50, 55, 60, 65, 70, 75, 80, 85, 90, and 95 lb/ft$^3$. In still further aspects, the volumetric density can be a value within any range derived from the above values, including for example, a density of from about 15 to about 75 pounds per cubic foot.

In certain aspects, the methods described herein provide a densified fiber batt (e.g., the first fiber batt 14a or the second densified fiber batt 14b) having a density of at least about 10 lb/ft$^3$, including exemplary values of at least about 15 lb/ft$^3$, about 20 lb/ft$^3$, about 25 lb/ft$^3$, about 30 lb/ft$^3$, about 35 lb/ft$^3$, about 40 lb/ft$^3$, about 45 lb/ft$^3$, or about 50 lb/ft$^3$. In certain aspects, the densified fiber batt can have a density in a range between any two foregoing values.

In yet other aspects, the methods described herein provide a densified fiber batt (e.g., the first fiber batt 14a or the second densified fiber batt 14b) having a density no greater than about 50 lb/ft$^3$, about 45 lb/ft$^3$, about 40 lb/ft$^3$, about 35 lb/ft$^3$, about 30 lb/ft$^3$, 25 lb/ft$^3$, about 20 lb/ft$^3$, about 15 lb/ft$^3$, or about 10 lb/ft$^3$. In certain aspects, the densified fiber batt can have a density in a range between any two foregoing values. It is understood that each densified batt can have a density as low as a density of a fiber batt comprising a substantially identical first plurality of fibers and a substantially identical a second plurality of fibers that has not undergone any densification processes, for example heating or pressurizing.

In some aspects, the methods described herein provide a combination of densified fiber batts (e.g., the first fiber batt 14a with a first density and the second densified fiber batt 14b with the second density) wherein first density can be from 10 lb/ft$^3$ to 30 lb/ft$^3$ and the second density can be from 40 lb/ft$^3$ to about 100 lb/ft$^3$. In exemplary aspects, the first density can be from 10 lb/ft$^3$ to 100 lb/ft$^3$, and the second density can be from 5 lb/ft$^3$ to 100 lb/ft$^3$, or from 30 lb/ft$^3$ to 100 lb/ft$^3$, 75 lb/ft$^3$ to 120 lb/ft$^3$, or about 100 lb/ft$^3$. In further aspects, the first density can be from 5 lb/ft$^3$ to 100 lb/ft³, or from 5 lb/ft³ to 30 lb/ft³, and the second density can be from 40 lb/ft³ to about 100 lb/ft³. In other aspects, the first density can be from 5 lb/ft³ to 100 lb/ft³, or from 5 lb/ft³ to 30 lb/ft³, and the second density can be from 5 lb/ft³ to 100 lb/ft³, or from 30 lb/ft³ to 100 lb/ft³, 75 lb/ft³ to 120 lb/ft³, or about 100 lb/ft³.

It is further understood that the methods described herein provide the densified fiber batt having a density as low as a density of a fiber batt comprising a substantially identical first plurality of fibers, a substantially identical a second plurality of fibers, and a substantially identical a third plurality of fibers that has not undergone any densification processes, for example heating or pressurizing.

In some aspects, described herein are methods to provide the rigid core of the surface covering element having a variable density across the rigid core. In certain aspects, described herein are methods to provide the rigid core comprising a first portion having a first density and a second portion having a second density different from the first density. To form rigid core having different densities, in some aspects, the ratio of the first and the second plurality of fibers can be manipulated to achieve a desirable result. In other aspects, the ratio of the first, the second and the third plurality of fibers can be manipulated to achieve a desirable result.

It is understood that the first, second, and third plurality of fibers can be present in any foregoing amount or ratio.

In still further aspects, methods to provide the rigid backing portion of the surface covering element having a variable density across the rigid core can comprise forming at least two densified fiber batts. In the aspects, where two or more densified fiber batts are formed, each of the densified batts can be formed by any method described herein and exhibit density that can be same or different from another densified fiber batt.

In certain aspects, the step of overlaying the pluralities of fibers can be performed by utilizing a card and cross lapping system, an airlay system, or a combination thereof. It is understood that in some aspects, after the overlaying step, the step of forming the rigid core can further comprise needle punching. In yet other aspects, the step of forming the rigid core further comprises heat and pressure treating at conditions effective to form the densified fiber batt.

Depending on the temperature at which the surface covering element is heated, the use of heat resistant conveyer belts can be desired. Generally, the surface covering element is heated to a temperature sufficient to at least partially melt the plurality of fibers having the lowest melting point. In some aspects, the heat treating conditions effective to form the densified fiber batt can comprise heating at a temperature of from about 180° F. to about 800° F., including exemplary temperatures of about 200° F., 250° F., 300° F., 350° F., 400° F., 450° F., 500° F., 550° F., 600° F., 700° F., and about 750° F. In yet other aspects, the heat treating conditions effective to form the densified fiber batt can comprise heating at a temperature from about 180° F. to about 350° F., about 250° F. to about 450° F., or about 250° F. to about 350° F., or about 350° F. to about 600° F.

In certain aspects, an oven can be utilized for heat treating. In yet other aspects, it is understood that any known in the art heating means can be utilized. For example, in some aspects, the fiber batt can be hot oil calendared. In still further aspects, the heat and pressure can come from continuous double belted presses, for example, commercially available from TPS-Sandvik, Meyer, Held, Schott and Meissner, or Hymmen. In yet other aspects, the heat and pressure can come from single and multiple opening static presses.

During or after the heating step, the fiber batt can optionally be subjected to a pressure treating conditions effective to form the densified fiber batt. In these aspects, the fiber batt is subjected to a pressure from above 0 to about 1,200 pounds per square inch (psi), including for example, from about 10 psi to about 500 psi, 100 to 1,000 psi, from about 250 to 1,000 psi, from about 400 to about 950 psi, from about 500 to 750 psi, or from about 600 to 700 psi.

Additional details of exemplary rigid cores, methods of making rigid cores, and an exemplary apparatus suitable for making the surface covering elements is disclosed in U.S. Patent Application Publication No. 2018/0134016A1, the entirety of which is hereby incorporated by reference herein.

In some aspects, the step of affixing of the decorative portion to the first surface of the rigid core can comprise applying an adhesive. In some aspects, it is understood that the adhesive material can be applied by any known in the art methods. In some aspects, the adhesive can be applied as a hot melt. In other aspects, the adhesive can be extruded on the densified fiber batt. In yet other aspects, the adhesive material can be applied as an aqueous dispersion.

In yet other aspects, the method further comprises applying a substrate layer described above. The substrate layer can be applied by any known in the art methods, for example by nip roll method, or any lamination method known in the art.

In yet other aspects, the decorative portion can be affixed to the first surface of the rigid core by any other known in the art methods. In some methods the step of affixing comprises needling the second surface of the decorative portion with the first surface of the rigid core. In certain aspects, after the decorative portion adhered to the rigid core, the heat press can be applied at a temperature from about 230° F. (110° C.) to about 482° F. (250° C.) and under sufficient pressure to adhere the decorative portion to the rigid core. In yet other aspects, the decorative portion can be affixed to the first surface of the rigid core by needling. For example, the decorative portion comprising a plurality of whitened PET fibers as a decorative substrate or a decorative surface layer can be affixed to the first surface of the rigid core by needling. In other aspects, decorative portion affixed by needling can be further heat pressed to the first surface of the rigid core. It is understood that the image layer can be transferred to any visible surface of the article by any known in the art methods. In some aspects, the image layer can be formed by directly printing on the substrate after the decorative portion is affixed to the first surface of the rigid core. In yet other aspects, the image layer can be transferred by other methods that include but are not limited to rotogravure, digital and direct pad printing, screen printing, or sublimation after the decorative portion is affixed to the first surface of the rigid core.

In yet other aspects, the method further comprises a step of applying a wear layer having a first surface and an opposed surface. In still further aspects, the wear layer overlies the decorative portion such that a second surface of the wear layer is in contact with the first surface of the decorative portion. It is understood that the wear layer can be applied by any known in the art methods. In some aspects, the wear layer is applied by a nip roll method. In these aspects, the wear layer is applied to the decorative layer and is laminated by passing through an additional nip roller. In other aspects, the wear layer can be UV cured.

For example, the top surface of the decorative layer can optionally be post pressed, smoothed, embossed or contoured to obtain various functional or aesthetic effects. Additionally, other optional materials can be applied to the densified fiber batt(s) during the manufacturing process.

In connection with any of the inventive aspects described herein, the methods can optionally comprise a sanitization step. As one of skill in the art will appreciate, the presence of impurities in reclaimed carpet material can necessitate a need to sanitize the reclaimed materials for health and safety purposes. To that end, the plurality of fibers can be subjected to a sanitization step at any point during the manufacture: sanitizing the plurality of fibers prior to its use in the methods described herein or alternatively by sanitizing the plurality of fibers during or after formation of the surface covering element.

In some aspects, at least one of the densified fiber batts 14 has a density in the range of from about 5 lb/ft$^3$ to about 100 lb/ft$^3$, including exemplary densities of 10, 15, 20, 25, 30, 35, 40, 45, 50, 55, 60, 65, 70, 75, 80, 85, 90, and 95 lb/ft$^3$. In still further aspects, the volumetric density can be a value within any range derived from the above values, including for example, a density of from about 15 to about 75 lb/ft$^3$.

In certain aspects, at least one of the densified fiber batts 14 can have a density of at least about 10 lb/ft$^3$, including exemplary values of at least about 15 lb/ft$^3$, about 20 lb/ft$^3$, about 25 lb/ft$^3$, about 30 lb/ft$^3$, about 35 lb/ft$^3$, about 40 lb/ft$^3$, about 45 lb/ft$^3$, or about 50 lb/ft$^3$. In certain aspects, the densified fiber batt can have a density in a range between any two foregoing values.

In yet other aspects, at least one of the densified fiber batts 14 can have a density no greater than about 50 lb/ft$^3$, about 45 lb/ft$^3$, about 40 lb/ft$^3$, about 35 lb/ft$^3$, about 30 lb/ft$^3$, 25 lb/ft$^3$, about 20 lb/ft$^3$, about 15 lb/ft$^3$, or about 10 lb/ft$^3$. In certain aspects, the densified fiber batt can have a density in a range between any two foregoing values. It is understood that the densified batt can have a density as low as a density of a fiber batt comprising a substantially identical first plurality of fibers and a substantially identical a second plurality of fibers that has not undergone any densification processes, for example heat treating or pressure treating processes.

In still further aspects, the rigid core can comprise at least two densified fiber batts. In aspects where two or more densified fiber batts are present, each of the densified fiber batts exhibits a density that can be the same or different from another densified batt. In some aspects, the rigid core can comprise a first densified fiber batt having a third density and a second densified fiber batt having a fourth density. In some aspects, the third density is larger than the fourth density. In yet other aspects, the third density is lower than the fourth density. In certain aspects, the first densified fiber batt is adjacent to the first surface of the rigid core, while the second densified fiber batt is adjacent to the second surface of the rigid core. In aspects where more than two densified fiber batts are present, each of the densified fiber batts can be arranged in any configuration determined by one of ordinary skill in the art and useful for a final application. In these aspects, each of the densified fiber batts can exhibit same or a different density.

In still further aspects, the inventive rigid core can exhibit a density that is lower than a density of a conventional rigid backing portion comprising a layer of polyvinyl chloride material or a wood based material as a core, and wherein such conventional rigid backing is absent of a densified fiber batt. In yet other aspects, the inventive rigid core exhibits a higher porosity than a comparable conventional rigid backing portion comprising a layer of polyvinyl chloride material or a wood material as a core, and wherein such conventional rigid backing is absent of a densified fiber batt.

In certain aspects, the first and second plurality of fibers can have a substantially random orientation, a substantially uniform orientation, or any variation of a predetermined orientation that is between a random and uniform orientation. Still further, the plurality of fibers can itself comprise any desired combination of various orientations. In some aspects, the first plurality of fibers is substantially randomly oriented. In yet other aspects, the first plurality of fibers is uniformly oriented. In still further aspects, the first plurality of fibers in arranged in a predetermined orientation.

In some aspects, the second plurality of oriented fibers is substantially randomly oriented. In yet other aspects, the second plurality of fibers is uniformly oriented. In still further aspects, the second plurality of fibers in arranged in a predetermined orientation.

In still further aspects, the first and the second plurality of fibers can have the same or different orientation. In some exemplary aspects, the first plurality of fibers can have a substantially random orientation, while the second plurality of fiber can have a uniform orientation. In yet other exemplary aspects, the first plurality of fibers can have a uniform orientation, while the second plurality of fibers is substantially randomly oriented. In still further aspects, both the first and the second plurality of fibers can have the same orientation.

In certain aspects, the first and second plurality of fibers can comprise a staple fiber, a bulk continuous fiber (BCF), or a combination thereof. In some aspects, the first plurality of fibers can comprise a staple fiber. In other aspects, the first plurality of fibers can comprise a bulk continuous fiber. In yet other aspects, the first plurality of fibers can comprise both staple and bulk continuous fiber.

In other aspects, the second plurality of fibers can comprise a staple fiber. In other aspects, the second plurality of fibers can comprise a bulk continuous fiber. In yet other aspects, the second plurality of fibers can comprise both staple and bulk continuous fiber.

In still further aspects, the first plurality of fibers can comprise a staple fiber, while the second plurality of fibers can comprises a bulk continuous fiber. In yet other aspects, the first plurality of fibers can comprises a bulk continuous fiber, while the second plurality of fibers can comprise a staple fiber. In still further aspects, both first and second plurality of fibers can comprise a staple fiber. In yet other aspects, both first and second plurality of fibers can comprise a bulk continuous fiber.

According to certain aspects, the first and second plurality of fiber can exhibit a substantially uniform size, including substantially uniform liner density measured in denier units and substantially uniform fiber lengths. However, in alternative aspects, fibers present within the first and second plurality of fiber can have non-uniform linear densities and non-uniform fiber lengths. According to these aspects, the population of the first and second plurality of fibers having non-uniform linear fiber densities can, for example, have individual linear fiber densities in the range of from about 1 to about 500 denier, including exemplary values of about 3 denier, about 5 denier, about 10 denier, about 15 denier, about 20 denier, about 25 denier, about 30 denier, about 35 denier, about 40 denier, about 45 denier, about 50) denier, about 60 denier, about 70 denier, about 80 denier, about 90 denier, about 100 denier, about 120 denier, about 150) denier, about 170 denier, about 200 denier, about 250) denier, about 300 denier, about 350 denier, about 400 denier, and about 450) denier. It is further understood that the population of the first and second plurality of fibers can have individual linear fiber density in any range between two foregoing values. For example, in certain aspects, the individual linear fiber density can be from about 1 to about 5 denier, from about 5 denier to about 25 denier, from about 5 denier to about 200 deniers, or from about 100 denier to about 500 denier. Still further, a population of the first and second plurality of fibers having non-uniform linear density can collectively provide an average linear fiber density that is, for example, greater than 5 denier, greater than 10 denier, greater than 15 denier, greater than 20 denier, greater than 25 denier, greater than 30 denier, greater than 35 denier, greater than 40 denier greater than 45 denier, greater than 50 denier, greater than 100 denier, greater than 200 denier, greater than 300 denier, or even greater than 400 denier.

In other aspects, the first and second plurality of fibers, each independently can comprise polyester, polypropylene, polyethylene, polyamides, polyurethane, polylactic acid, acetal, co-polyester, co-polyamide, polystyrene, or a combination thereof.

Exemplary fibers present in the first and/or second plurality of fibers can include polyamides, polyester, polypropylene, polyethylene, polyurethane, polyethylene terephthalate, polytrimethylene terephthalate, latex, styrene butadiene rubber, or any combination thereof.

In some aspects, the densified fiber can further comprise a third plurality of fibers. In some aspects the third plurality of fibers can be natural fibers. In yet other aspect, the natural fibers exhibit a decomposition point. In yet other aspects, the third plurality of fibers can comprise a staple fiber, a bulk continuous fiber, or a combination thereof.

In yet other aspects, the natural fibers comprise baste fibers, cotton, cellulose, wool, silk, linen, mineral, coconut, glass, or any combination thereof.

In some aspects, the third plurality of fibers can have a substantially random orientation. In yet other aspects, the third plurality of fibers can have a substantially uniform orientation. In still further aspects, the third plurality of fibers can have a predetermined orientation.

In still further aspects, the third plurality of fiber can exhibit a substantially uniform size, including substantially uniform liner density measured in denier units and substantially uniform fiber lengths. However, in alternative aspects, fibers present within the third plurality of fiber can have non-uniform linear densities and non-uniform fiber lengths. According to these aspects, a population of the third of fibers having non-uniform linear fiber densities can, for example, have individual linear fiber densities in the range of from about 1 to about 500 denier, including exemplary values of about 3 denier, about 5 denier, about 10 denier, about 15 denier, about 20 denier, about 25 denier, about 30 denier, about 35 denier, about 40 denier, about 45 denier, about 50 denier, about 60 denier, about 70 denier, about 80 denier, about 90 denier, about 100 denier, about 120 denier, about 150 denier, about 170 denier, about 200 denier, about 250 denier, about 300 denier, about 350 denier, about 400 denier, and about 450 denier. It is further understood that the population of the first and second plurality of fibers can have individual linear fiber density in any range between two foregoing values. For example, in certain aspects, the individual linear fiber density can be from about 1 to about 5 denier, from about 5 denier to about 25 denier, from about 5 denier to about 200 deniers, or from about 100 denier to about 500 denier. Still further, a population of the first and second plurality of fibers having non-uniform linear density can collectively provide an average linear fiber density that is, for example, greater than 5 denier, greater than 10 denier, greater than 15 denier, greater than 20 denier, greater than 25 denier, greater than 30 denier, greater than 35 denier, greater than 40 denier greater than 45 denier, greater than 50 denier, greater than 100 denier, greater than 200 denier, greater than 300 denier, or even greater than 400 denier.

In yet other aspects, it is understood that the decomposition point of the fibers present in the third plurality of fibers is higher than the first and/or second melting point such that heat treatment effective to result in melting and consolidation of at least one of the first and second pluralities of fibers does not result in any substantial decomposition of natural fibers present.

In still further aspects, the surface covering element can comprise a) a rigid backing portion comprising a rigid core having a first surface and an opposed second surface, wherein the rigid core comprises at least one densified fiber batt and wherein the at least one densified fiber batt is comprised of first plurality of fibers comprising a natural fiber having a decomposition temperature and a second plurality of fibers having a melting point lower than the decomposition temperature of the first plurality of fibers; and b) a decorative portion having a first surface and an opposed second surface, wherein the second surface of the decorative portion is affixed to the first surface of the rigid core. It is understood that in these aspects, the first plurality of fiber comprising natural fibers can be any natural fibers listed above. It is further understood that the second plurality of fibers can comprise any foregoing fibers, or any fibers described below.

In yet other aspects, where the first plurality of fibers is not a natural fiber, the first plurality of fibers can comprise a multi-component fiber. In yet other aspects, the second pluralities of fibers can comprise a multi-component fiber. It is understood that in some aspects of the present invention, the multi-component fibers can be defined as "extruding two polymers from the same spinneret with both polymers contained within the same filament." In some aspects, multi-component fibers can have any cross sectional shape or geometry that can be contemplated by one of ordinary skill in the art. In some aspects, the multi-component fibers can have cross-section structures that include but are not limited to side-by-side fiber, sheath-core fiber, islands-in-the-sea fiber and segmented-pie cross-section types.

It is understood that in some aspects, the multicomponent fiber can comprise at least first component having the first melting point and at least second component having the second melting point different from the first melting point. It is further understood that in some aspects, the at least first component can comprise a polymeric component. In yet other aspects, the at least second component can comprise a polymeric component.

In yet other exemplary aspects, the multi-component fibers comprise a sheath-core configuration. In some aspects, the sheath comprises the first component. In yet other aspects, the core comprises a second component. In yet other aspects, the sheath can comprise a second component and the core can comprise the first component. It is understood that both sheath and core can comprise any mentioned above fibers as a component. In some aspects, the polymeric core component can have a higher melting point than the polymeric sheath component. In some aspects, the polymeric core component can comprise polyester, aliphatic polyamides, polyphenylene oxide and/or co-polymers or blends thereof. In yet other aspects, the polymeric core component can comprise polyester, polypropylene, polyethylene, polyamides, polyurethane, polylactic acid, acetal, co-polyester, co-polyamide, polystyrene, or a combination thereof. In yet other aspects, the polyester can comprise polyethylene terephthalate, poly butylene terephthalate, or polyparaphenylene terephthalamide. In yet other aspects, the polymeric core comprises polyethylene terephthalate. In further aspects, the sheath polymer can comprise a polyamide, polyethylene, or polyester. In still further aspects, the sheath polymer can comprise polyester, polypropylene, polyethylene, polyamides, polyurethane, polylactic acid, acetal, co-polyester, co-polyamide, polystyrene, or a combination thereof. In yet further aspects, the sheath polymer can comprise a nylon, or polypropylene. In still further aspects, the sheath-core multi-component fiber comprises a polyester as a core component and nylon as a sheath component.

It is further understood that in some aspects the sheath and core of the multi-component fiber can comprise the same polymer having different melting points. In still further aspects, the sheath-core multi-component fiber comprises a polyester as a core component and polyethylene as a sheath component. In still further aspects, the sheath-core multi-component fiber comprises a polyester having the first melting point as a core component and a polyester having the second melting point as a sheath component.

It is understood that in aspects, where the multi-component fiber is used in a combination with the natural fiber, the melting point of each component in the multi-component fiber is lower than the decomposition temperature of the natural fiber.

In some aspects, the at least one densified fiber batt described herein can comprise a first plurality of fibers having a first melting point, wherein the first plurality of fibers comprises a single-component fiber. In yet other aspects, the at least one densified fiber batt described herein can comprise a second plurality of fibers comprising a multi-component fiber comprising at least first component having the first melting point and at least second component having a second melting point.

In yet other aspects, the at least one densified fiber batt described herein comprises a plurality of oriented multi-component fibers, wherein each of the plurality of oriented multi-component fibers comprises at least first component having a first melting point and at least second component having a second melting point different from the first melting point. In these aspects, the plurality of oriented multi-component fibers can comprise any multi-component fiber configurations described herein. In yet other aspects, any disclosed herein polymers can be used as any component of the plurality of oriented multi-component fibers.

In still further aspects, the rigid core is substantially free of a PVC material, or high density fiber (HDF) derived from a wood based material, or medium density fiber (MDF) derived from a wood based material. In still further aspects, the rigid core is substantially free of a wood based material.

In yet other aspects, the rigid core can further comprise a filler component.

Exemplary and non-limiting fillers that can be incorporated into the rigid core layer can include calcium carbonate, fly-ash, recycled calcium carbonate, aluminum trihydrate, talc, nano-clay, barium sulfate, barite, barite glass fiber, glass powder, glass cullet, metal powder, alumina, hydrated alumina, clay, magnesium carbonate, calcium sulfate, silica, glass, fumed silica, carbon black, graphite, cement dust, feldspar, nepheline, magnesium oxide, zinc oxide, aluminum silicate, calcium silicate, titanium dioxide, titanates, glass microspheres, chalk, calcium oxide, and any combination thereof. In some aspects, the filler content can be virgin. In other aspects, the filler content can be reclaimed.

In certain aspects, the filler content can be reclaimed from post-consumer articles. In yet other aspects, the filler content can be reclaimed from post-industrial articles.

In certain aspects, the filler comprises one or more of calcium carbonate, aluminum trihydrate, barite, feldspar, cullet, fly ash, kaolin clay, limestone, polyurethane foam, rubber, thermoplastic powder, thermoplastic polyurethane (TPU), wollastonite, or any combination thereof.

In yet other aspects, the rigid core can further comprise a pigment, a flame retardant, surfactant, processing aids, or a combination thereof. In certain aspects, the rigid core can comprise one or more flame retardant components. Exemplary flame retardants that can be incorporated into the rigid core include, without limitation, organo-phosphorous flame retardants, red phosphorous magnesium hydroxide, magnesium dihydroxide, hexabromocyclododecane, bromine containing flame retardants, brominated aromatic flame retardants, melamine cyanurate, melamine polyphosphate, melamine borate, methylol and its derivatives, silicon dioxide, calcium carbonate, resorcinol bis-(diphenyl phosphate), brominated latex base, antimony trioxide, strontium borate, strontium phosphate, monomeric N-alkoxy hindered amine (NOR HAS), triazine and its derivatives, high aspect ratio talc, phosphated esters, organically modified nanoclays and nanotubes, non-organically modified nanoclays and nanotubes, ammonium polyphosphate, polyphosphoric acid, ammonium salt, triaryl phosphates, isopropylated triphenyl phosphate, phosphate esters, magnesium hydroxide, zinc borate, bentonite (alkaline activated nanoclay and nanotubes), organoclays, aluminum trihydrate (ATH), azodicarbonamide, diazenedicarboxamide, azodicarbonic acid diamide (ADC), triaryl phosphates, isopropylated triphenyl phosphate, triazine derivatives, alkaline activated organoclay and aluminum oxide. Any desired amount of flame retardant can be used in the rigid core and the selection of such amount will depend on a required application. Such amounts can be readily determined through no more than routine experimentation.

In other aspects, any pigments or surfactant known in the art can be utilized. In yet other aspects, any processing aids known in the art can be used. In some aspects, processing aids can include without limitation antistatic chemicals, lubricants, oils, or any combination thereof.

In yet other aspects, at least one of the first, second or third pluralities of fibers can comprise reclaimed fibers. In some aspects, the reclaimed fibers can comprise a post-consumer fiber. In still further aspects, the reclaimed fibers can comprise a post-industrial fiber. In still further aspects, the reclaimed fibers can comprise both a post-consumer and post-industrial fiber. It is understood that the both post-consumer and post-industrial fibers can comprise any fibers described above. It is understood that in some aspects, the reclaimed fiber is reclaimed from a carpet or carpet tile. In yet other aspects, the reclaimed fiber can be fiber reclaimed from any material, for example any material comprising polymeric and/or natural fibers.

The reclaimed fibers can be present in the final rigid core in any desired amount, including for example an amount in the range of from greater than 0% to 100% by weight, including exemplary amounts of 5%, 10%, 15%, 20%, 25%, 30%, 35%, 40%, 45%, 50%, 55%, 60%, 65%, 70%, 75%, 80%, 85%, 90%, and 95%. In still further aspects, the reclaimed fibers can be present in an amount within any range derived from the above values, including for example, an amount in the range of from greater than 0 weight percent to 90 weight percent, from 30 weight percent to 70 weight percent, or from 40 weight percent to 60 weight percent. In still other aspects, the surface covering element can comprise at least about 10%, at least about 20%, at least about 30%, at least about 40%, or at least about 50% reclaimed material, such as post-consumer material, post-industrial material, post-commercial material, or a combination thereof. In another aspect, the surface covering element comprises from about 50% to about 100% reclaimed material. It is further understood that the reclaimed material in the surface covering element can be present as reclaimed fibers, reclaimed fillers, or a combination thereof.

It is understood that by incorporating reclaimed material into the surface covering elements several advantages can be realized. For example, second generation products incorporating the reclaimed material have less of an environmental footprint relative to traditional composites, comprising only virgin materials. In a further aspect, the use of reclaimed material reduces the amount of traditional, often environmentally harmful materials that previously were sent to landfill, while still providing the same or similar level of composite performance. Still further, substitution of virgin material with reclaimed material can reduce the manufacturing costs associated with producing various composite products, such as floor covering products. Additionally, the incorporation of reclaimed material into a second generation composite can also provide mechanical reinforcement or stability to the second generation composite, if desired.

In certain aspects, it is understood that the first plurality of fibers, the second plurality of fibers, and the third plurality of fibers described herein can be present in any amount to provide the rigid core having a desired density. It is understood that the first, second and third pluralities of fibers can be present in any ratio to provide the rigid core having a desired density.

In some aspects, the plurality of fibers having a lowest melting can be present in the final rigid core (or in the densified fiber batt) in any desired amount, including for example an amount in the range of from greater than 0% up to 100% by weight, including exemplary amounts of 5%, 10%, 15%, 20%, 25%, 30%, 35%, 40%, 45%, 50%, 55%, 60%, 65%, 70%, 75%, 80%, 85%, 90%, 95%, and 100%. In still further aspects, the plurality of fibers having a lowest melting can be present in an amount within any range derived from the above values, including for example, an amount in the range from about 0% to about 80% of the total amount of fibers present in the densified fiber batt, alternatively from about 5% to about 60% of the total amount of fibers present in the densified fiber batt, alternatively from about 30% to about 50% of the total amount of fibers present in the densified fiber batt or still alternatively from about 40% to about 60% of the total amount of fibers present in the densified fiber batt. In the aspects, wherein the at least one plurality of fibers comprises a multi-component fiber, the ratio between various components having different melting points in the multi-component fiber can be any ratio chosen by one of ordinary skill in the art. In some aspects, wherein two components are presents, the ratio by the weight between two components having different melting points can be from about 0.1, about 0.2, about 0.3, about 0.4, about 0.5, about 0.6, about 0.7, about 0.8, about 0.9, or 1.

In yet other aspects, wherein the at least first plurality of fibers comprises a multi-component fiber, wherein at least first component has a first melting point and at least second component has a second melting point different from the first melting point and the at least second plurality of fibers comprises a plurality of single-component fibers, wherein the single-component fiber have the first melting point, the ratio between the first plurality of fibers and the second plurality of fibers can be any value determined by one of ordinary skill in the art to obtained a densified fiber batt having a desirable density. In some exemplary aspects, the multi-component fiber can be present in an amount from greater than 0 to 100% by weight, including exemplary values of about 1%, about 5%, about 10%, about 20%, about 30%, about 40%, about 50%, about 60%, about 70%, about 80%, about 90%, about 95%, about 99%, and about 99.9%. In some aspects, the multi-component fiber can be present in 100% by weight.

In certain aspects, the rigid core has a thickness in the range from about 1.5 mm to about 12 mm, including exemplary values of about 2 mm, about 3 mm, about 4 mm, about 5 mm, about 6 mm, about 7 mm, about 8 mm, about 9 mm, about 10 mm, and about 11 mm. In still further aspects, the rigid core can have a thickness in any range between two foregoing values. In some aspects, the thickness can be in the range from about 1.5 mm to about 12 mm, from about 2 mm to about 12 mm, or from about 5 mm to about 12 mm.

It is further understood that in some aspects, the inventive rigid core can be permeable to moisture. In yet other aspects, the inventive rigid core is impermeable to moisture. In still further aspects, the inventive rigid core does not accumulate or hold moisture within the densified fiber batt. It is further understood that wherein moisture does not alter the rigid core. In certain aspects, moisture does not alter mechanical properties of the rigid core.

In certain aspects, the surface covering element described herein can exhibit a radiant panel test ratings of Class I according to the ASTM E-648 standard.

In yet other aspects, the surface covering element exhibits a residential indentation of less than 0.0005 inches, when measured according to ASTM F-1914-07 (2011). In yet other aspects, the surface covering element exhibits a commercial indentation of less than 0.0005 inches, when measured according to ASTM F-1914-07 (2011).

In yet other aspects, the surface covering element passes a bend radius test measured according to ASTM F137 (2013). In certain aspects, the test is considered as passed if no cracks or breaks are observed when the sample of the inventive article is bend around 1" mandrel. In other aspects, the test is considered as passed if no cracks or breaks are observed when the sample of the inventive article is bend around >0.25" mandrel.

It is understood that stiffness of the product can be determined by measuring a flexural modulus and a flexural strength of the article.

In some aspects, the flexural modulus and the flexural strength can be measured by the three-point bending flexural test. In some aspects, the flexural modulus (also known as a bending modulus) is calculated as the ratio of stress to strain in flexural deformation, or the tendency for a material to bend. In certain aspects, this value measured in units of force per are, is determined from the slope of a stress-strain curve produced by a flexural test, for example, test according to ASTM D790 standard. A rectangular beam behaving as an isotropic linear material, having a width w and a h height is used for a test. The values used in the test in addition to the width w and height h of the beam, are a distance L that is measured between the two outer supports, a second moment of area of the beam's cross-section I (not shown), and a deflection d that exists due to the load F applied at the middle of the beam. Calculations of the flexural modulus can be done according to the formula (1)

$$E_f = \frac{L^3 F}{4wh^3 d} \quad (1)$$

From the elastic beam theory, d can be found according to the formula (2)

$$d = \frac{L^3 F}{48IE}, \quad (2)$$

wherein again, I is area moment of inertia of cross section, and E is a modulus of elasticity. For a rectangular beam I can be found according to the formula (3)

$$I = \frac{1}{12} wh^3. \quad (3)$$

Thus, $E_f$=E, i.e, $E_f$ equals to Young's modulus or elastic modulus.

Without being bound by a theory, ideally, flexural or bending modulus of elasticity is equivalent to the tensile modulus (Young's modulus) or comprehensive modulus of elasticity. However, as one of ordinary skill in the art would readily appreciate, polymers are a part of unpredictable art, and thus, the values of flexural modulus can greatly vary.

Building codes determine the maximum deflection, usually as a fraction of the span e.g. 1/400 or 1/600. Thus, the allowable stress (or the strength limit state) or the serviceability limit state (various deflection considerations) can affect the minimum dimensions of the member required for the test.

In some aspects, the surface covering element exhibits a flexural modulus from about 0.1 to about 15.0 GPa, including exemplary values of about 0.5 GPa, about 1 GPa, about 1.5 GPa, about 2 GPa, about 2.5 GPa, about 3 GPa, about 3.5 GPa, about 4 GPa, about 4.5 GPa, about 5 GPa, about 5.5 GPa, about 6 GPa, about 6.5 GPa, about 7 GPa, about 7.5 GPa, about 8 GPa, about 8.5 GPa, about 9 GPa, about 9.5 GPa, about 10 GPa, about 10.5 GPa, about 11 GPa, about 11.5 GPa, about 12 GPa, about 12.5 GPa, about 13 GPa, about 13.5 GPa, about 14 GPa, and about 14.5 GPa.

In yet other aspects, the surface covering element exhibits a flexural strength from about 20 to about 400 MPa, including exemplary values of about 30 MPa, about 50 MPa, about 70 MPa, about 100 MPa, about 130 MPa, about 150 MPa, about 170 MPa, about 200 MPa, about 230 MPa, about 250 MPa, about 270 MPa, about 300 MPa, about 330 MPa, about 350 MPa, and about 370 MPa.

In still further aspects, the surface covering element exhibits substantially equalized component stress. In certain aspects of the current invention, the surface covering element exhibits substantially uniform stability across the article and thus does not require acclimation periods in order to allow stresses to equalize prior to any installation. In still other aspects, the dimensional stability and lack of need for an acclimation period can be measured according to the ISO 23999 Heat Curl Dimensional Stability standards. In certain aspects, the dimensional stability can be measured by analyzing the article's dimensional variations when the article is heated to a temperature of about 80° C./180° F. and then cooled back to ambient temperature. The maximum variation shown in such aspects, can be no more than about 0.05%, no more than about 0.1%, no more than about 0.11%, no more than about 0.12%, no more than about 0.13%, no more than about 0.14%, no more than about 0.15%, no more than about 0.16%, no more than about 0.17%, no more than about 0.18%, no more than about 0.19%, no more than about 0.20%, no more than about 0.25%, no more than about 0.30%, no more than about 0.35%, no more than about 0.40%, or no more than about 0.5%. In still other aspects, the maximum variation observed can be any range of values derived by any two foregoing values. In some aspects, the maximum variation is from about 0.1% to about 0.2%, or about 0.15% to about 0.5%. In still other aspects, the maximum variation is no greater than about 0.17%, when the article is heated to 80° C./180° F. and then cooled to the ambient temperature.

In certain aspects, the decorative portion of the inventive article comprises a decorative substrate layer or a decorative surface layer. As used herein, it should be understood that the term decorative substrate layer and decorative surface layer can be used interchangeably. In some aspects, the decorative surface layer comprises polyvinyl chloride (PVC), whitened PVC, opaque PVC, oriented polypropylene (OPP), polyolefin (PO), woven polyethylene (PE), nonwoven PE, woven polypropylene (PP), nonwoven PP, woven PET, whitened fiber PET, nonwoven PET, woven nylon, nonwoven nylon, conventional paper, conventional foil, or foiled oriented polypropylene. In still further aspects, the decorative surface layer can comprise one or more of a heat stabilized biaxially-oriented PET (BoPET), amorphous PET (aPET), recycled PET (rPET), polyethylene terephthalate glycol-modified (PETG), polyolefin, cyclic olefin copolymer (COC), cyclic olefin polymer (COP), polyvinylidene fluoride (PVDF), polylactic acid (PLA) copolymers, nylon, cellulose acetate, poly(methyl methacrylate) (PMMA), thermoplastic polyurethane (TPU), thermoplastic elastomers (TPS), polycarbonate, polyethylene (PE), or a copolymer thereof.

In certain aspects, the surface layer has a thickness from about 1 mil to about 20 mil, including exemplary values of about 2 mil, about 3 mil, about 4 mil, about 5 mil, about 6 mil, about 7 mil, about 8 mil, about 9 mil, about 10 mil, about 11 mil, about 12 mil, about 13 mil, about 14 mil, about 15 mil, about 16 mil, about 17 mil, about 18, mil, and about 19 mil. In still further aspects, the substrate layer can have any thickness in a range derived from any two of the above listed exemplary values. For example, the substrate layer can comprise a thickness in a range of from about 1 mil to about 5 mil, or from about 3 mil to about 7 mil, or from about 7 mil to about 20 mil. In still further aspects, the substrate layer can be a film.

In yet other aspects, the decorative portion comprises an image layer. In certain aspects, the image layer is printed or otherwise transferred on a surface of the decorative substrate layer or the decorative surface layer. In yet other aspects, the image layer is printed or otherwise transferred on a surface of any visible layer. In some aspects, the substrate layer and the visible layer are the same. In other aspects, the substrate layer and the visible layer are different.

In some aspects, the decorative layer is affixed to the first surface of the rigid core with an adhesive. It is understood that the adhesive can be any adhesive known in the art. In some aspects, the adhesive comprises at least one of acrylic adhesive, ethylene-vinyl acetate (EVA), ethylene-acrylic acid (EAA), ethylene-acrylic acid-maleic anhydride (EAA-MAH), ethylene-methyl acrylate-maleic anhydride (EMA-MAH), ethylene-vinyl acetate-maleic anhydride (EVA-MAH), low density-polyethylene-maleic anhydride (LDPE-MAH), high density polyethylene-maleic anhydride (HDPE-MAH), polyurethane (PUR), polyurethane dispersions (PUD), a UV-curable adhesive, or a combination thereof. In some aspects, the polyurethane dispersions can comprise isocyanate terminated urethane polymer, methylenebis(phenylisocyanate), methylene bisphenyl isocyanate, and the like. The polyurethane dispersion can further comprise oxazolidine hardeners and various modifiers.

In some aspects, the UV-curable adhesives can comprise polyurethane acrylate-based main-chain polymers, polyisoprene acrylate-based main chain polymers, poly butadiene acrylate-based main-chain polymers, monomeric (meth) acrylates, and the like. In certain aspects, the UV-curable adhesives can comprise any adhesives known in the art that are capable of being cured upon exposure to a UV light. In other aspects, the UV-curable adhesive can further comprise other additives such as, for example, and without limitation photo-polymerization initiators, additives that increase flexibility of the resin, and the like.

In still further aspects, the adhesive comprises ethylene-vinyl acetate (EVA). In yet other aspects, the adhesive comprises ethylene-acrylic acid (EAA). In still further aspects, the adhesive comprises polyurethane dispersions (PUD), polyurethane reactive (PUR) hot melt adhesive.

The adhesive can comprise substantially linear ethylene polymers and homogeneously branched linear ethylene polymers (i.e., homogeneously branched ethylene polymers). Homogeneously branched ethylene polymers (including substantially linear ethylene polymers in particular) have low solidification temperatures, good adhesion to polypropylene, and low modulus relative to conventional ethylene polymers such as low density polyethylene (LDPE), heterogeneously branched linear low density polyethylene (LLDPE), high density polyethylene (HDPE), and heterogeneously branched ultra-low density polyethylene (ULDPE).

In certain aspects, the adhesive has a thickness of about 0.1 mil to about 5 mil, including exemplary values of about 0.5 mil, about 1 mil, about 1.5 mil, about 2 mil, about 2.5 mil, about 3 mil, about 3.5 mil, about 4 mil, and about 4.5 mil. In still further aspects, the adhesive can have any thickness in a range derived from any two of the above listed exemplary values. For example, the adhesive can comprise a thickness in a range of from about 0.5 mil to about 4 mil, or from about 0.1 mil to about 3 mil.

In yet other aspects, the decorative portion can be affixed to the first surface of the rigid core by any other known in the art methods. In some exemplary aspects, the decorative portion can be affixed to the first surface of the rigid core by needling. For example, the decorative portion comprising a plurality of whitened PET fibers as a substrate can be affixed to the first surface of the rigid core by needling. In other aspects, decorative portion affixed by needling can be further heat pressed to the first surface of the rigid core. In these aspects, the image layer can be formed by a direct printing on the substrate, after the decorative portion is affixed to the first surface of the rigid core. In such aspects, the randomly fibers with a base shade of white or near white can be affixed to the first surface of the rigid core. The fibers used to form this substrate can comprise at least about 10%, at least about 20%, at least about 30%, at least about 40%, at least about 50%, at least about 60%, at least about 70%, at least about 80%, at least about 90%, or at least about 95% of a low melt fiber which can create a bond to the rigid core when heated to a temperature from about 110 to about 250° C., including exemplary values of about 120° C., about 130° C., about 140° C., about 150° C., about 160° C., about 170° C., about 180° C., about 190° C., about 200° ° C., about 210° C., about 220° C., about 230° C., and about 240° C. In yet other aspects, the resulting surface can be further flattened to maintain a level of smoothness allowing the transferred image to have a sufficient detail by a belt or use of a release film or paper.

In some aspects, the image layer can comprise any conventional ink, dye, pigment, or other marking substance that can be applied in a desired pattern. For example and without limitation, the image layer can comprise water-based, soy-based, a UV-cured inks, and/or solvent-based pigments. In still further aspect, the image layer is a UV cured ink.

It is understood that UV-cured inks can comprise photo-initiators, pigments, additives, monomers and oligomers of various polymers, and the like. In some exemplary aspects, the UV-cured inks can comprise, without limitation, (5-ethyl-1,3-dioxan-5yl)methyl acrylate, 2-phenoxyethyl acrylate: 1-vinylhexahydro-2H-azepin-2-one, substituted phosphine oxide, thrimethylolpropane triacrylate, phenyl bis (2,4 6-trimethylbenzoyl)phosphine oxide, epoxy acrylate oligomer, diacrylate monomer, multi-functional monomers, amine modified acrylate oligomer, 1-vinylhexahydro-2H-asepin-2-one, diacrylate oligomers, benzophenone, triacrylate monomers, 1-hydroxy-cyclohexylphenyl-ketone, 2 hydroxy-2-methylpropiophenone, and the like.

It is further understood that the image layer can be applied to the decorative substrate layer or decorative surface layer or any other visible layer by any conventional printing means, which can include, without limitation, directly printing, rotogravure printing, digital printing, silk screen printing, flexography printing, lithography printing, offset-lithography printing, relief printing, thermography printing, thermal sublimation printing, dye-sublimation printing, heat-transfer printing, digital printing, and the like. In yet other aspects, the image layer can be applied by reverse printing. In such exemplary aspects, the image is printed on an underside of the clear film rather than top side of the film In still further aspects, the image layer can be applied by a digital printing. In some aspects, the image layer is applied prior to affixing the decorative portion to the rigid core. In other aspects, the image layer is applied after the decorative portion is affixed to the rigid core. In an exemplary aspect, the image layer can comprise inks and pigments manufactured by INX Inks, Durst, HP, EFI, Sun Chemical, DyStar, Sensient Inks Technologies, Kao Collins, Mankiewicz, Marabu, Borbeaux or Tiger. In yet other aspects, the image layer can be digitally printed utilizing digital printers manufactured by Cefla, Durst, Hymmen, EFI, Barbaran, Zimmer Austria, HP, Fujifilm, Mimaki, AGFA. Kodak, Canon, Epson, KBA, OKI, Ricoh, Heidelberg, Mutoh or Inca.

In certain aspects, the formed image layer can be a continuous layer that covers substantially all of the top surface of the substrate. In yet other aspects, the formed image layer can be a discontinuous layer that covers only a portion of the top surface of the substrate. In yet other aspects, the image layer can have any desired aesthetic appearance. In some exemplary aspects, the image layer can have an appearance of simulated hardwood or ceramic flooring.

In some aspects, the decorative layer portion can have any suitable weight and thickness. In some embodiments, the decorative layer portion has a weight of from about 0.2 ounces per square yard to about 1.0 ounce per square yard, including, without limitation, decorative layer portions having a weight of about 0.3, 0.4, 0.5, 0.6, 0.7, 0.8, and 0.9 ounces per square yard. In a further aspect, a decorative layer portion can have a total thickness of from about 1 mil to about 20 mil, including exemplary values of about 2 mil, about 3 mil, about 4 mil, about 5 mil, about 6 mil, about 7 mil, about 8 mil, about 9 mil, about 10 mil, about 11 mil, about 12 mil, about 13 mil, about 14 mil, about 15 mil, about 16 mil, about 17 mil, about 18 mil, and about 19 mil; although virtually any thickness can be used.

In yet other aspects, the decorative layer can further comprise an aesthetic layer such as a thin veneer of slate, ceramic, stone, wood, cork, a film, woven, or nonwoven material.

In yet other aspects, the decorative layer can comprise woven fibers, stone, ceramics, glass, needle punch, leather, animal hides, veneer, or any combination thereof.

In an additional aspect, any of aesthetic layers described above can be adhered to any foregoing substrate.

In yet other aspects, the decorative portion further comprises a wear layer adhered to the image layer. In yet other aspects, the wear layer is not present. In the aspects where the wear layer is present, the wear layer can comprise, for example and without limitation, conventional ionomers, polyethylene terephthalate (PET), polyurethane, polypropylene, polytrimethylene terephthalate (PTT), polyamide, polyvinyl chloride (PVC), and the like. In a further aspect, the wear layer can comprise surlyn resin, such as, for example and without limitation, SurlynR 1706 resin, manufactured by E.I. du Pont de Nemours and Company, Inc.

In a still further aspect, the wear layer can comprise heat stabilized biaxially-oriented PET (BoPET), amorphous PET (aPET), recycled PET (rPET), polyethylene terephthalate glycol-modified (PETG), polyolefin, cyclic olefin copolymer (COC), cyclic olefin polymer (COP), polyvinylidene fluoride (PVDF), polylactic acid (PLA) copolymers, nylon, cellulose acetate, poly(methyl methacrylate) (PMMA), thermoplastic polyurethane (TPU), thermoplastic elastomers (TPE), polycarbonate, polyethylene (PE), high density polyethylene (HDPE), low density polyethylene (LDPE), or a copolymer thereof.

In some aspects, the wear layer is substantially transparent. In other aspects, the wear layer is substantially opaque.

In a yet further aspect, the wear layer can have a thickness in the range of greater than 0 mil to about 30 mil, including exemplary thickness ranges of from about 0.5 mil, about 1 mil, about 1.5 mil, about 2 mil, about 2.5 mil, about 3 mil, about 3.5 mil, about 4, about 5 mil, about 6 mil, about 7 mil, about 8 mil, about 9, about 10 mil, about 12 mil, about 15 mil, about 17 mil, about 20 mil, about 22 mil, about 25 mil, and about 27 mil. In a still further aspect, the thickness of the wear layer can be in a range derived from any of the above listed exemplary values. For example, the thickness can in the range up to 4 mil, or in the range from about 4 mil to about 9 mil, or from 4 mil to about 16 mil.

In some aspects, the wear layer is laminated to the decorative portion. In still other aspects, the wear layer is UV cured to the decorative portion. In some aspects, where the wear layer is not present, a spray material can be applied to the top surface of the decorative portion. In such aspects, the sprayed material can serve as a scratch coat.

In certain aspects, the decorative portion has a top layer. In yet other aspects, a top surface of the decorative portion is embossed or embossed in register. It is understood that in the aspects, where the wear layer is present, the top layer of the decorative portion is the wear layer. In the aspects, where the wear layer is absent, but the decorative portion comprises a substrate layer, a substrate surface is the top layer of the decorative portion. In the aspects, where any additional aesthetic layers are present and the wear layer is absent, a surface aesthetic layer is the top surface of the decorative portion. In certain aspects, the wear layer is a scratch layer.

In the aspects where the wear layer is not present, the scratch layer can be directly applied to the top surface of the decorative layer. It is understood that the scratch layer can be applied by any known in the art methods. In some aspects, the scratch layer can comprise any materials suitable for this purpose. In still further aspects, the scratch layer can comprise transparent polyurethane based materials or transparent acrylic based materials. In still further aspects, the scratch layer can be UV cured.

The embossing can be done to provide visuals and textures to duplicate wood grain, slate and other visuals. Laser etching can also be utilized in lieu of embossing to achieve the desired aesthetics. Some other potential methods for texturing the surface of flooring materials, wall boards, ceilings, or roofing products include drag wiring while the temperature of an extruded product is still above glass transition temperature or dragging probes across the surface while the product or probe is moving. Further, a texture can be embedded in the surface of an injection mold, compression mold or vacuum form mold, as well. A texture can also be hot or cold stamped with pressure for creating the desired look. It is understood that embossing can be done by any techniques known in the art. In some aspects, embossing roller, film, or UV "freeze" embossing can be used. In still further aspects, the embossing can be done by using heat or inert UV cure under film or band. In some exemplary aspects, the embossing can be done by applying a viscous liquid that can be cured and crosslinked. In some further aspects, a film with a texture can be applied to the viscous liquid that is then cured through the film to form a textured surface mirroring the texture that was present on the textured film.

In certain aspects, the embossing can be pressed in or cured in the scratch or wear layer. In other aspects, the image layer comprising embossing can be pressed into or cured into the scratch or the wear layer by various means, for example and without limitation, by a UV cure molding method.

The surface covering element can generally have any desired shape. In one aspect, the surface covering element is substantially planar. Planar composite articles can be useful for floor coverings, or decking material, wall boards, and the like. The planar composite articles can be manufactured into any desired size, which will generally depend on the targeted application. In one aspect, the planar composite article can have a length dimension greater than a width dimension. For example, the planar composite article can be sized as a sheet, for example, a 4'×8' sheet. Such a sheet can be cut into smaller sizes as needed. In other aspects, the composite articles can be sized into a 4'×8' composite, or a 4'×10' composite, or a 5'×12' among other elongate sizes. In other aspects, the composite articles can be further sized to fit an end product. Elongate composite articles can be useful, for example, as decking materials. The composite articles can also have any desired thickness. In one aspect, the composite has a thickness of from about 0.25 to about 3 inches, or 0.5 inches to 1.0 inches, or from about 0.25 to about 0.75 inches, or from about 0.6 to about 0.75 inches. In a further aspect, the composite articles can have a suitable shape and dimension commonly used in floor tile, wall tile, ceiling tile, including but not limited to dimensions such as 1'×1', 2'×2', 3'×3, 3'×5', and the like. In some aspects, the flooring article can be configured as a panel, a plank, a sheet, a board, or a tile. In other aspects, the surface covering element is a wall board article. In yet other aspect, the surface covering element is a ceiling article. Other shapes include diamond, rectangles, triangles, rounds and other shapes.

In some aspects, the surface covering element comprises a plurality of side edges. In certain aspects, the plurality of side edges are not profiled to define any form of an interlocking or other fastening mechanisms by which adjacent articles can be attached to one another. In still further aspects, the plurality of side edges are profiled to form an interlocking mechanisms. It is understood that any known in the art interlocking mechanisms can be formed.

In further aspects, the surface covering element can be directly glued to a subsurface. In still further aspects, the surface covering element can be loosely laid on a subsurface. In yet other aspects, the surface covering element can be adhered to the surface with a lock dots, adhesive strips, and the like. In still further aspects, the surface covering element can be magnetically attached to a subsurface. In some exemplary aspects, the subsurface can, for example, be coated with any substance that has magnetic properties or that contains material otherwise attracted to a magnetic material. For example, the subfloor can be coated with iron oxide or iron. In such aspects, the surface covering element can further comprises any substance exhibiting magnetic properties and be connected to the subfloor with the magnetic field present once the flooring is installed.

In still further aspects, the surface covering element can be attached to an additional backing material. It is understood that the attachment of the surface covering element to the additional backing material can be done by any methods known in the art. For example, and without limitation, the attachment can be done by applying an adhesive material or freely laying the surface covering element on the additional backing. In yet other exemplary aspects, the additional backing material can be a backing film, a foam, a glue or adhesive layer, or other cushioned or padded backings such as cork. In certain aspects, the additional backing can comprise a non-slip backing, a cushion, an embossed backing, a foam, a carpet underlay, or any combination thereof.

It is understood that the non-slip backing, cushion, embossed backing, foam or the carpet underlay can comprise any materials known in the art. In some aspects, they can comprise polyurethane foams. In other aspects the can comprise plastomeric polyethylene based foams or backings, such as HBEP or SLEP based foams. The description of the exemplary backings can be found, for example, in the U.S. patent application Ser. No. 11/915,553, U.S. patent application Ser. No. 12/786,036, U.S. patent application Ser. No. 12/619,059, or the U.S. Pat. No. 9,410,026, which are incorporated herein by reference in their entity.

In various aspects, the surface covering element disclosed herein advantageously exhibit higher radiant panel ratings, reduced squeakiness, improved sound reduction properties and less embodied energy.

Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A surface covering element comprising:
a rigid core comprising at least one densified fiber batt, the rigid core comprising a first surface and an opposed second surface that are spaced apart along a first axis, wherein the rigid core comprises a plurality of edges that define a periphery of the rigid core, wherein the plurality of edges comprise at least a first edge and an opposed second edge that are spaced along a second axis that is perpendicular to the first axis, wherein the first edge comprises a tongue, wherein the second edge defines a groove.

Aspect 2: The surface covering element of aspect 1, wherein the at least one densified fiber batt is a plurality of layers of densified fiber batts.

Aspect 3: The surface covering element of aspect 2, wherein the plurality of layers of densified fiber batts comprise at least a first densified fiber batt and a second densified fiber batt, wherein the first densified fiber batt has a first density, wherein the second densified fiber batt has a second density that is greater than the first density.

Aspect 4: The surface covering element of aspect 3, wherein the first and second densified fiber batts are needle punched together.

Aspect 5: The surface covering element of aspect 3 or aspect 4, wherein the first densified fiber batt defines the first surface.

Aspect 6: The surface covering element of any one of aspects 3-5, wherein the second density is from 40 lb/ft$^3$ to about 100 lb/ft$^3$.

Aspect 7: The surface covering element of any one of aspects 3-6, wherein the first density is from 10 lb/ft$^3$ to 30 lb/ft$^3$.

Aspect 8: The surface covering element of any one of aspects 3-7, wherein the second densified fiber batt defines the tongue, and wherein portions of the second densified fiber batt define the groove.

Aspect 9: The surface covering element of any one of the preceding aspects, wherein the least one densified fiber batt comprises a first densified fiber batt having a density from 40 lb/ft$^3$ to about 100 lb/ft$^3$.

Aspect 10: The surface covering element of any one of the preceding aspects, wherein the tongue has a thickness along the first axis, wherein the thickness of the tongue is from about 0.5 mm to about 3 mm.

Aspect 11: The surface covering element of aspect 8, wherein the thickness of the tongue is about 1 mm.

Aspect 12: The surface covering element of aspect 8 or aspect 9, wherein the first surface of the rigid core meets the first edge at a first boundary of the rigid core, wherein the tongue extends from the first boundary of the rigid core by a protrusion distance along the second axis, wherein the protrusion distance is at least 2 mm.

Aspect 13: The surface covering element of any one of the preceding aspects, wherein the tongue has opposed first and second surfaces that are spaced along the first axis, wherein a reference plane bisects the opposed first and second surfaces of the tongue, wherein the reference plane forms an oblique angle with the first surface of the rigid core.

Aspect 14: The surface covering element of any one of aspects 1-10, wherein the tongue has opposed first and second surfaces that are spaced along the first axis, wherein a reference plane bisects the upper and lower surfaces of the tongue, wherein the reference plane is parallel to the first surface of the rigid core.

Aspect 15: The surface covering element of aspect 13, wherein the groove is defined between opposed inner surfaces, wherein the opposed inner surfaces comprise first opposed portions, wherein a second reference plane bisects the first opposed portions, wherein the second plane forms the oblique angle with the first surface of the rigid core.

Aspect 16: The surface covering element of aspect 13, wherein at least one inner surface of the opposed inner surfaces that define the groove comprises a second portion that is parallel to the first surface of the rigid core.

Aspect 17: The surface covering element of any one of the preceding aspects, wherein the tongue and the groove are formed by machining.

Aspect 18: The surface covering element of any one of the preceding aspects, wherein the first and second edges comprise opposed ends, wherein the plurality of edges further comprise opposed third and fourth edges that extend between respective opposed ends of the first and second edges, wherein the tongue is a first tongue, wherein the groove is a first groove, wherein the third edge defines a second tongue, and wherein the fourth edge defines a second groove.

Aspect 19: The surface covering element of aspect 16, wherein the first and second edges extend perpendicularly to, or generally perpendicularly to, the third and fourth edges.

Aspect 20: The surface covering element of any one of the preceding aspects, wherein the first edge has a length along a third axis that is perpendicular to each of the first and second axes, wherein the tongue has a length that is equal to, or substantially equal to, the length of the first edge.

Aspect 21: The surface covering element of any one of aspects 1-17, wherein the first edge has a length along a third axis that is perpendicular to each of the first and second axes, wherein the tongue has a length that is less than the length of the first edge.

Aspect 22: The surface covering element of any one of the preceding aspects, wherein the groove is defined by opposed legs, wherein the rigid core defines:
  at least one through opening that extends through the tongue along the first axis; and
  at least one through opening that extends through the legs that define the groove from the first surface to the second surface of the rigid core.

Aspect 23: The surface covering element of any one of the preceding aspects, further comprising a decorative portion having a first surface and an opposed second surface, wherein the second surface of the decorative portion is affixed to the first surface of the rigid core.

Aspect 24: The surface covering element of any one of the preceding aspects, wherein the at least one densified fiber batt comprises randomly oriented fibers.

Aspect 25: The surface covering element of any one of the preceding aspects, wherein the at least one densified fiber batt comprises substantially uniformly oriented fibers.

Aspect 26: The surface covering element of any one of the preceding aspects, wherein the at least one densified fiber batt comprises a first densified fiber batt, the first densified fiber batt comprising a first plurality of fibers having a first melting point and a second plurality of fibers, wherein at least a portion of the second plurality of fibers has a second melting point that is lower than the first melting point.

Aspect 27: The surface covering element of aspect 26, wherein the at least a portion of the second plurality of fibers that has the second melting point is an outer portion of the fibers of the second plurality of fibers.

Aspect 28: The surface covering element of any one of the preceding aspects, wherein the at least one densified fiber batt comprises a first densified fiber batt, the first densified fiber batt comprising a first plurality of fibers having a first melting point and a second plurality of fibers, wherein the second pluralities of fibers comprises a multi-component fiber, wherein the multi-component fiber comprises a sheath and a core provided as a sheath core configuration, and wherein the sheath has a second melting point that is lower than the first melting point.

Aspect 29: The surface covering element of any one of the preceding aspects, wherein the surface covering element is a flooring element.

Aspect 30: The surface covering element of any one of aspects 1-25, wherein the surface covering element is a wall covering element.

Aspect 31: The surface covering element of any one of aspects 1-25, wherein the surface covering element is an erosion control mat.

Aspect 32: The surface covering element of any one of the preceding aspects, wherein the rigid core comprises light transmitting fibers.

Aspect 33: The surface covering element of any one of the preceding aspects, further comprising an adhesive on the tongue.

Aspect 34: The surface covering element of aspect 30, further comprising a release liner that covers the adhesive.

Aspect 35: A surface covering comprising:
  a plurality of surface covering elements as in any one of the preceding aspects, wherein the plurality of surface covering elements comprises a first surface covering element and a second surface covering element, wherein the tongue of the first surface covering element is received with the groove of the second surface covering element.

Aspect 36: The surface covering of aspect 32, further comprising an adhesive that couples the tongue of the first surface covering element to the groove of the second surface covering element.

Aspect 37: The surface covering of aspect 32, wherein the adhesive comprises a compression-activated adhesive.

Aspect 38: The surface covering of aspect 32, wherein the adhesive comprises an ultraviolet-activated adhesive.

Aspect 39: The surface covering of any one of aspects 32-35, wherein the first surface covering element defines at least one through opening that extends through the tongue along the first axis,
  wherein the groove of the second surface covering element is defined by a pair of legs, wherein the second surface covering element defines at least one through opening that extends through the legs that define the groove from the first surface to the second surface of the rigid core,
  wherein the surface covering further comprises at least one fastener, each fastener of the at least one fastener extending through each of:
    one of the at least one through opening that extends through the tongue of the first surface covering element; and
    one of the at least one through opening that extends through the legs that define the groove.

Aspect 40: A method of assembling a surface covering comprising a plurality of surface covering elements as in any one of aspects 1-34, the plurality of surface covering elements comprising at least a first surface covering element and a second surface covering element, the method comprising:
  inserting the tongue of the first surface covering element into the groove of the second surface covering element.

Aspect 41: The method of aspect 40, further comprising adhering the tongue of the first surface covering element to the groove of the second surface covering element.

Aspect 42: The method of aspect 41, wherein adhering the tongue of the first surface covering element to the groove of the second surface covering element comprises activating an ultraviolet-activated adhesive with ultraviolet radiation.

Aspect 43: A method comprising:
forming, along a first edge of a rigid core, a tongue, wherein the rigid core comprises at least one densified fiber batt comprising a first surface and an opposed second surface that are spaced apart along a first axis, wherein the rigid core comprise a plurality of edges that define a periphery of the rigid core, the plurality of edges comprising at least the first edge and an opposed second edge that are spaced along a second axis that is perpendicular to the first axis.

Aspect 44: The method of aspect 43, further comprising: forming, along the second edge, a groove.

Aspect 45: The method of aspect 43 or aspect 44, wherein forming, along the first edge, the tongue comprises machining the tongue.

Aspect 46: The method of aspect 44 or aspect 45, wherein forming, along the second edge, the groove comprises machining the groove.

Aspect 47: The method of aspect 45 or aspect 46, wherein machining the first groove comprises machining the first groove with a CNC machine.

Aspect 48: The method of any one of aspects 45-47, wherein machining the first groove comprises machining the first groove with a double ended tenoner.

Aspect 49: The method of any one of aspects 44-48, further comprising:
securing the rigid core to a machining device; and
releasing the rigid core from the machining device only after the tongue and the groove have been machined.

Aspect 50: The method of any one of aspects 43-49, further comprising, forming in a mold, the rigid core.

Aspect 51: The method of aspect 50, wherein forming, in the mold, the rigid core comprises:
heating a fiber batt at a first temperature for a first period of time; and
subjecting the heated fiber batt to pressure with a surface of a press, wherein the surface has a surface temperature that is less than the first temperature, thereby forming the at least one densified fiber batt.

Aspect 52: The method of aspect 51, wherein the fiber batt comprises a first plurality of fibers having a first melting point and a second plurality of fibers, wherein at least a portion of the second plurality of fibers has a second melting point that is lower than the first melting point, wherein the first temperature is greater than the second melting point and lower than the first melting point.

Aspect 53: The method of aspect 52, wherein the at least a portion of the second plurality of fibers that has the second melting point is an outer portion of the fibers.

Aspect 54: The method of aspect 52 or aspect 53, wherein the second pluralities of fibers comprises a multi-component fiber, wherein the multi-component fiber comprises a sheath and a core provided as a sheath core configuration, and wherein the sheath has the second melting point.

Aspect 55: The method of aspect 54, wherein the at least one densified fiber batt comprises at least a first densified fiber batt and a second densified fiber batt, the method further comprising needle punching the at least one densified fiber batt to entangle the first densified fiber batt and the second densified fiber batt.

Aspect 56: The method of aspect 55, wherein the first densified fiber batt has a first density, wherein the second densified fiber batt has a second density that is greater than the first density, wherein the first densified fiber batt defines the first surface.

Although the foregoing invention has been described in some detail by way of illustration and example for purposes of clarity of understanding, certain changes and modifications may be practiced within the scope of the appended claims.

What is claimed is:

1. A surface covering element comprising:
a rigid core comprising a plurality of layers of densified fiber batts, the rigid core comprising a first surface and an opposed second surface that are spaced apart along a first axis, wherein the rigid core comprises a plurality of edges that define a periphery of the rigid core;
wherein the plurality of edges comprise at least a first edge and an opposed second edge that are spaced along a second axis that is perpendicular to the first axis, wherein the first edge comprises a tongue, wherein the second edge defines a groove,
wherein the plurality of layers of densified fiber batts comprise at least a first densified fiber batt and a second densified fiber batt, wherein the first densified fiber batt has a first density, wherein the second densified fiber batt has a second density that is greater than the first density,
wherein the second densified fiber batt defines the tongue, and wherein portions of the second densified fiber batt define the groove, and
wherein each densified fiber batt comprises a plurality of fibers, wherein at least a portion of the plurality of fibers have been melted to bind to adjacent fibers of the plurality of fibers.

2. The surface covering element of claim 1, wherein the first and second densified fiber batts are needle punched together.

3. The surface covering element of claim 1, wherein the first densified fiber batt defines the first surface.

4. The surface covering element of claim 1, wherein the second density is from 40 lb/ft$^3$ to about 100 lb/ft$^3$.

5. The surface covering element of claim 1, wherein the first density is from 10 lb/ft$^3$ to 30 lb/ft$^3$.

6. The surface covering element of claim 1, wherein the tongue has a thickness along the first axis, wherein the thickness of the tongue is from about 0.5 mm to about 3 mm.

7. The surface covering element of claim 1, wherein thickness of the tongue is about 1 mm.

8. The surface covering element of claim 1, wherein the first surface of the rigid core meets the first edge at a first boundary of the rigid core, wherein the tongue extends from the first boundary of the rigid core by a protrusion distance along the second axis, wherein the protrusion distance is at least 2 mm.

9. The surface covering element of claim 1, wherein the tongue has opposed first and second surfaces that are spaced along the first axis, wherein a reference plane bisects the opposed first and second surfaces of the tongue, wherein the reference plane forms an oblique angle with the first surface of the rigid core.

10. The surface covering element of claim 9, wherein the groove is defined between opposed inner surfaces, wherein the opposed inner surfaces comprise first opposed portions, wherein a second reference plane bisects the first opposed portions, wherein the second plane forms the oblique angle with the first surface of the rigid core.

11. The surface covering element of claim 9, wherein at least one inner surface of the opposed inner surfaces that define the groove comprises a second portion that is parallel to the first surface of the rigid core.

12. The surface covering element of claim 1, wherein the tongue has opposed first and second surfaces that are spaced along the first axis, wherein a reference plane bisects the opposed first and second surfaces of the tongue, wherein the reference plane is parallel to the first surface of the rigid core.

13. The surface covering element of claim 1, wherein the tongue and the groove are formed by machining.

14. The surface covering element of claim 1, wherein the first and second edges comprise opposed ends, wherein the plurality of edges further comprise opposed third and fourth edges that extend between respective opposed ends of the first and second edges, wherein the tongue is a first tongue, wherein the groove is a first groove, wherein the third edge defines a second tongue, and wherein the fourth edge defines a second groove.

15. The surface covering element of claim 1, wherein the first edge has a length along a third axis that is perpendicular to each of the first and second axes, wherein the tongue has a length that is equal to, or substantially equal to, the length of the first edge.

16. The surface covering element of claim 1, wherein the first edge has a length along a third axis that is perpendicular to each of the first and second axes, wherein the tongue has a length that is less than the length of the first edge.

17. The surface covering element of claim 1, wherein the groove is defined by opposed legs, wherein the rigid core defines:
at least one through opening that extends through the tongue along the first axis; and
at least one through opening that extends through the legs that define the groove from the first surface to the second surface of the rigid core.

18. The surface covering element of claim 1, further comprising a decorative portion having a first surface and an opposed second surface, wherein the second surface of the decorative portion is affixed to the first surface of the rigid core.

19. The surface covering element of claim 1, wherein at least one densified fiber batt of the plurality of layers of densified fiber batts comprises randomly oriented fibers.

20. The surface covering element of claim 1, wherein at least one densified fiber batt of the plurality of layers of densified fiber batts comprises substantially uniformly oriented fibers.

21. The surface covering element of claim 1, wherein the first densified fiber batt comprises a first plurality of fibers having a first melting point and a second plurality of fibers, wherein at least a portion of the second plurality of fibers has a second melting point that is lower than the first melting point.

22. The surface covering element of claim 21, wherein the at least a portion of the second plurality of fibers that has the second melting point is an outer portion of the fibers of the second plurality of fibers.

23. The surface covering element of claim 1, wherein the first densified fiber batt comprises a first plurality of fibers having a first melting point and a second plurality of fibers, wherein the second pluralities of fibers comprises a multi-component fiber, wherein the multi-component fiber comprises a sheath and a core provided as a sheath core configuration, and wherein the sheath has a second melting point that is lower than the first melting point.

24. The surface covering element of claim 1, wherein the rigid core comprises light transmitting fibers.

25. The surface covering element of claim 1, further comprising an adhesive on the tongue.

26. The surface covering element of claim 25, further comprising a release liner that covers the adhesive.

* * * * *